US010740268B2

United States Patent
Takahashi et al.

(10) Patent No.: US 10,740,268 B2
(45) Date of Patent: Aug. 11, 2020

(54) COMMUNICATION SYSTEM, COMMUNICATION SYSTEM CONTROL METHOD, AND PROGRAM

(71) Applicant: Sony Corporation, Tokyo (JP)

(72) Inventors: Hiroo Takahashi, Kanagawa (JP); Naohiro Koshisaka, Kanagawa (JP); Sonfun Lee, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/503,056

(22) Filed: Jul. 3, 2019

(65) Prior Publication Data

US 2020/0034322 A1 Jan. 30, 2020

Related U.S. Application Data

(63) Continuation of application No. 16/162,767, filed on Oct. 17, 2018, now Pat. No. 10,372,641, which is a (Continued)

(30) Foreign Application Priority Data

Oct. 1, 2015 (JP) ................. 2015-196191

(51) Int. Cl.
*G06F 13/364* (2006.01)
*G06F 13/42* (2006.01)
(Continued)

(52) U.S. Cl.
CPC .......... *G06F 13/364* (2013.01); *G06F 13/362* (2013.01); *G06F 13/404* (2013.01);
(Continued)

(58) Field of Classification Search
CPC ............... G06F 13/364; G06F 13/4282; G06F 13/4291; G06F 2213/0016
See application file for complete search history.

(56) References Cited

U.S. PATENT DOCUMENTS 5,511,165 A 4/1996 Brady et al.
7,117,283 B2 10/2006 Trembley
(Continued)

FOREIGN PATENT DOCUMENTS

| JP | H06-332812 A | 12/1994 |
| JP | 2012-034254 A | 2/2012 |
| JP | 2014-186500 A | 10/2014 |

OTHER PUBLICATIONS

Extended European Search Report dated May 6, 2019 for corresponding European Application 16851091.5.
(Continued)

*Primary Examiner* — Brian T Misiura
(74) *Attorney, Agent, or Firm* — Michael Best & Friedrich LLP

(57) ABSTRACT

Communication systems and communication control methods are disclosed. In one example, a slave device belonging to a group of devices to which arbitration is applicable sequentially transmits a start bit and a first address including a first bit having a value different from a corresponding first bit of predetermined pattern data. A master device sequentially transmits the start bit and the predetermined pattern data. The master device arbitrates the master device and the first slave device based on the value of the first bit.

6 Claims, 25 Drawing Sheets

Related U.S. Application Data continuation of application No. 15/879,728, filed on Jan. 25, 2018, now Pat. No. 10,140,230, which is a continuation of application No. 15/623,230, filed on Jun. 14, 2017, now Pat. No. 9,916,271, which is a continuation of application No. 15/063,992, filed on Mar. 8, 2016, now Pat. No. 9,727,506.

(51) Int. Cl.
  *G06F 13/362* (2006.01)
  *G06F 13/40* (2006.01)
(52) U.S. Cl.
  CPC ...... *G06F 13/4282* (2013.01); *G06F 13/4291* (2013.01); *G06F 2213/0052* (2013.01)

(56) References Cited

U.S. PATENT DOCUMENTS

| | | | |
|---|---|---|---|
| 7,284,079 | B2 | 10/2007 | Ervin |
| 7,707,339 | B2 | 4/2010 | Pigott et al. |
| 7,739,435 | B2 | 6/2010 | Gideons |
| 8,458,367 | B2 | 6/2013 | Rollig et al. |
| 9,336,167 | B2 | 5/2016 | Danis et al. |
| 9,411,772 | B2 | 8/2016 | Jones |
| 9,552,325 | B2 | 1/2017 | Sengoku et al. |
| 10,007,628 | B2 * | 6/2018 | Pitigoi-Aron ......... G06F 13/364 |
| 2012/0169659 | A1 | 7/2012 | Welland |
| 2014/0229644 | A1 | 8/2014 | Thanigasalam et al. |
| 2015/0100713 | A1 | 4/2015 | Sengoku |
| 2015/0199287 | A1 | 7/2015 | Sengoku |
| 2015/0309960 | A1 | 10/2015 | Pitigol-Aron et al. |
| 2016/0147684 | A1 | 5/2016 | Sengoku |
| 2016/0195910 | A1 | 7/2016 | Sengoku |
| 2016/0217090 | A1 | 7/2016 | Sengoku et al. |
| 2016/0246390 | A1 | 8/2016 | Lukanc et al. |
| 2017/0075852 | A1 | 3/2017 | Mishra et al. |

OTHER PUBLICATIONS

UM10204—Specification and user manual Rev5.0J, [online], Oct. 9, 2012, NXP semiconductors, [Aug. 26, 2015, search], Internet (http://www.nxp.com/documents/user_manual/UM10204_JA.pdf).
PCT International Search Report dated Dec. 13, 2017 for corresponding PCT Application PCT/JP2016/076570.
Cadence—"Design IP for MIPI I3C Master Controller", 2 pages; Dated 2016.
Cadence—"Design IP for MIPI I3C Slave Controller", 2 pages; Dated 2016.
I2C Bus—"UM 10204—I2C-bus specification and user manual, Rev. 6"; 64 Pages, Dated Apr. 4, 2014.
EE Times—"MEMS/Sensor Interface I3C Rocks" by R. Colin Johnson; 2 Pages, Dated Nov. 12, 2014.
MIPI Alliance, "MEMS and Sensors White Paper Series—Introduction to MIPI I3C Standardized Sensor Interface" Aug. 2016.
Extended European Search Report dated May 6, 2019 for corresponding European Application No. 16851091.5.

\* cited by examiner

FIG. 4

| COMMUNICATION SCHEME | HEADER TYPE | FIRST A[6:0] | SECOND A[6:0] | ARBITRATION POSSIBILITY | MAXIMUM NUMBER OF CONNECTABLE SLAVES | COMMUNICATION RATE |
|---|---|---|---|---|---|---|
| CASE 0 | TYPE 0 | RESERVED (0x7E) | DYNAMIC ADDRESS | YES | 112 SLAVES (0x08 TO 0x77) | LOW |
| CASE 1 | TYPE 1 | RESERVED (0x7E) | DYNAMIC ADDRESS, BUT A[6]=1b0 FIXED | YES | 56 SLAVES (0x08 TO 0x3F) | MIDDLE |
| CASE 2 | TYPE 0 | DYNAMIC ADDRESS (7 BITS) | | NO | 112 SLAVES (0x08 TO 0x77) | HIGH |
| CASE 3 | TYPE 1 | RESERVED (0x7E) | DYNAMIC ADDRESS, BUT A[6]:GROUP IDENTIFIER | YES | 112 SLAVES (0x08 TO 0x77) | MIDDLE |

FIG. 5
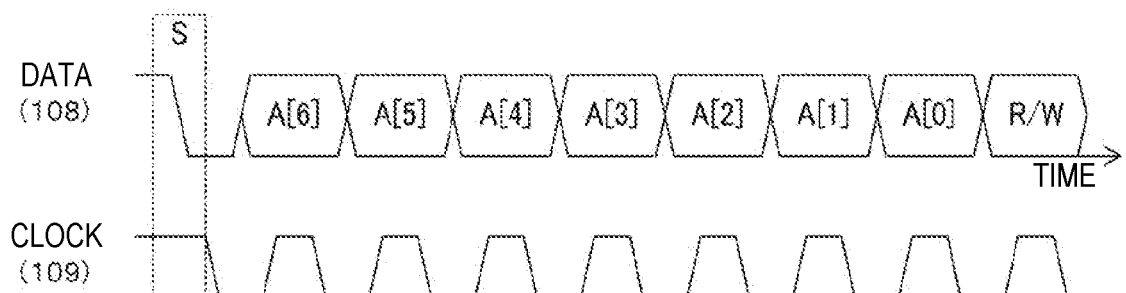
a
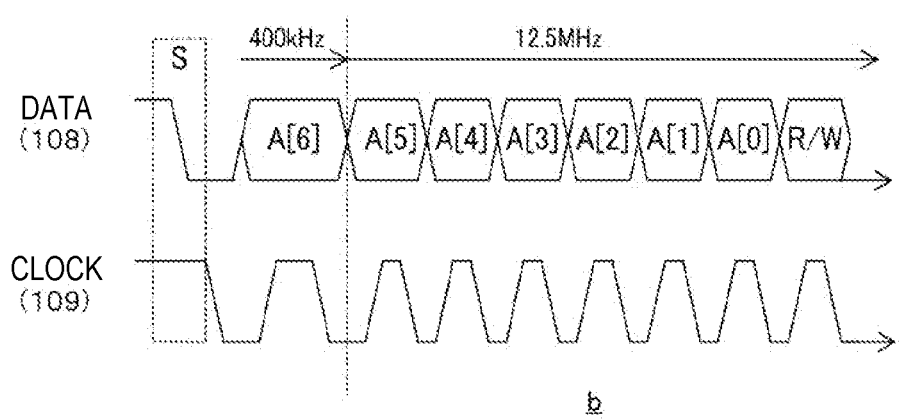
b

FIG. 7
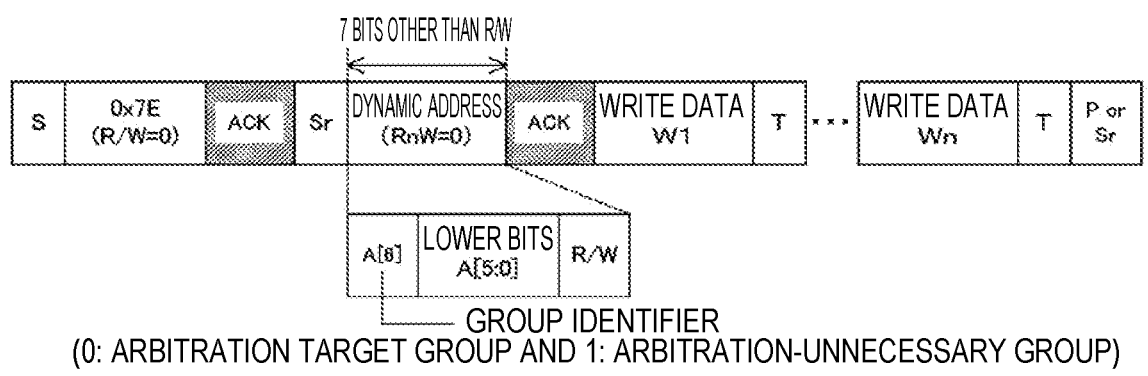
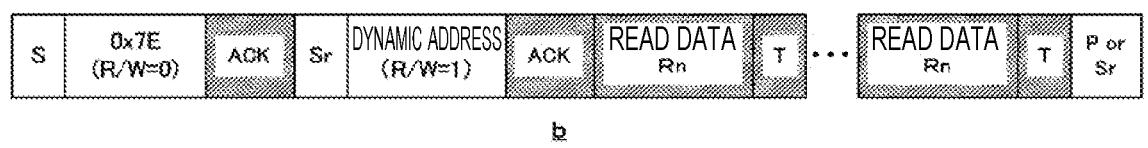

FIG. 9

| BIT | NAME | DESCRIPTION |
|---|---|---|
| BCR[7] | DEVICE ROLE(1) | 2'b00: I3C SLAVE<br>2'b01: I3C SECONDRY MASTER<br>2'b10: PEER TO PEER I3C SLAVE<br>2'b11: RESERVED |
| BCR[6] | DEVICE ROLE(0) | |
| BCR[5] | ONLY SDR/<br>SDR OR HDR POSSIBLE | 0: ONLY SDR<br>1: SDR OR HDR POSSIBLE |
| BCR[4] | BRIDGE IDENTIFIER | 0: NO BRIDGE DEVICE<br>1: BRIDGE DEVICE |
| BCR[3] | OFF LINE POSSIBILITY | 0: DEVICE GENERALLY RESPONDS TO<br>I3C COMMAND<br>1: DEVICE DOES NOT RESPOND TO<br>I3C COMMAND PERIODICALLY |
| BCR[2] | ADDITIONAL<br>REGISTER INDICATOR | RESERVED FOR INDICATING ADDITIONAL<br>REGISTER BYTE IN FUTURE |
| BCR[1] | I3C SLAVE(1) | 2'b00: INDEX 0<br>2'b01: INDEX 1<br>2'b10: INDEX 2<br>2'b11: INDEX 3(RESERVED) |
| BCR[0] | I3C SLAVE(0) | |

FIG. 10

| INDEX DETAILS | I3C SLAVE INDEX 0 | I3C SLAVE INDEX 1 | I3C SLAVE INDEX 2 | I3C SLAVE INDEX 3 |
|---|---|---|---|---|
| IN-BAND INTERRUPT REQUEST | Yes | Yes | No | No |
| MAXIMUM SCL CLOCK FREQUENCY POSSIBILITY | Yes | No | No | Yes |
| MAXIMUM SCL CLOCK FREQUENCY ALLOWANCE | Yes | Yes | Yes | Yes |
| HDR EXIT PATTERN DETECTION | Yes | Yes | Yes | Yes |

FIG. 17

| BIT | NAME | DESCRIPTION |
| --- | --- | --- |
| BCR[7] | DEVICE ROLE(1) | 2'b00: I2C SLAVE<br>2'b01: I2C SECONDRY MASTER<br>2'b10: PEER TO PEER I3C SLAVE<br>2'b11: SLAVE THAT DOES NOT PERFORM IN-BAND INTERRUPT OR THE LIKE |
| BCR[6] | DEVICE ROLE(0) | |
| BCR[5] | ONLY SDR/<br>SDR OR HDR POSSIBLE | 0: ONLY SDR<br>1: SDR OR HDR POSSIBLE |
| BCR[4] | BRIDGE IDENTIFIER | 0: NO BRIDGE DEVICE<br>1: BRIDGE DEVICE |
| BCR[3] | OFF LINE POSSIBILITY | 0: DEVICE GENERALLY RESPONDS TO<br>I3C COMMAND<br>1: DEVICE DOES NOT RESPOND TO<br>I3C COMMAND PERIODICALLY |
| BCR[2] | ADDITIONAL<br>REGISTER INDICATOR | RESERVED FOR INDICATING<br>ADDITIONAL REGISTER BYTE IN FUTURE |
| BCR[1] | ONLY I3C SLAVE I2 (1) | 2'b00: INDEX 0<br>2'b01: INDEX 1<br>2'b10: INDEX 2<br>2'b11: INDEX 3(RESERVED) |
| BCR[0] | ONLY I3C SLAVE I2 (0) | |

FIG. 18

| BIT | NAME | DESCRIPTION |
|---|---|---|
| BCR[7] | DEVICE ROLE (1) | 2'b00: I2C SLAVE<br>2'b01: I2C SECONDRY MASTER<br>2'b10: PEER TO PEER I3C SLAVE<br>2'b11: SLAVE THAT PERFORMS IN-BAND INTERRUPT |
| BCR[6] | DEVICE ROLE(0) | |
| BCR[5] | ONLY SDR/ SDR OR HDR POSSIBLE | 0: ONLY SDR<br>1: SDR OR HDR POSSIBLE |
| BCR[4] | BRIDGE IDENTIFIER | 0: NO BRIDGE DEVICE<br>1: BRIDGE DEVICE |
| BCR[3] | OFF LINE POSSIBILITY | 0: DEVICE GENERALLY RESPONDS TO I3C COMMAND<br>1: DEVICE DOES NOT RESPOND TO I3C COMMAND PERIODICALLY |
| BCR[2] | ADDITIONAL REGISTER INDICATOR | RESERVED FOR INDICATING ADDITIONAL REGISTER BYTE IN FUTURE |
| BCR[1] | ONLY I3C SLAVE I2 (1) | 2'b00: INDEX 0<br>2'b01: INDEX 1<br>2'b10: INDEX 2<br>2'b11: INDEX 3(RESERVED) |
| BCR[0] | ONLY I3C SLAVE I2 (0) | |

FIG. 19

| BIT | NAME | DESCRIPTION |
|---|---|---|
| BCR[7] | DEVICE ROLE(2) | 3'b000: I2C SLAVE<br>3'b100: I2C SECONDRY MASTER<br>3'b010: PEER TO PEER I3C SLAVE<br>3'b001: SLAVE THAT PERFORMS IN-BAND INTERRUPT<br>OTHERS: RESERVED |
| BCR[6] | DEVICE ROLE1) | |
| BCR[5] | DEVICE ROLE(0) | |
| BCR(4) | ONLY SDR/ SDR OR HDR POSSIBLE | 0: ONLY SDR<br>1: SDR OR HDR POSSIBLE |
| BCR(3) | BRIDGE IDENTIFIER | 0: NO BRIDGE DEVICE<br>1: BRIDGE DEVICE |
| BCR(2) | OFF LINE POSSIBILITY | 0: DEVICE GENERALLY RESPONDS TO I3C COMMAND<br>1: DEVICE DOES NOT RESPOND TO I3C COMMAND PERIODICALLY |
| BCR(1) | ADDITIONAL REGISTER INDICATOR | RESERVED FOR INDICATING ADDITIONAL REGISTER BYTE IN FUTURE |
| BCR[0] | MAXIMUM SCL CLOCK FREQUENCY POSSIBILITY | 0:Yes<br>1:No |

FIG. 20

| COMMUNICATION SCHEME | HEADER TYPE | FIRST A[6:0] | SECOND A[6:0] | ARBITRATION POSSIBILITY | MAXIMUM NUMBER OF CONNECTABLE SLAVES | COMMUNICATION RATE |
|---|---|---|---|---|---|---|
| CASE 0 | TYPE 0 | RESERVED(0x7E) | DYNAMIC ADDRESS | YES | 112 SLAVES (0x08 TO 0x77) | LOW |
| CASE 1 | TYPE 1 | RESERVED(0x7E) | DYNAMIC ADDRESS, BUT A[6]=1b0 FIXED | YES | 56 SLAVES (0x08 TO 0x3F) | MIDDLE |
| CASE 2 | TYPE 0 | DYNAMIC ADDRESS (7bits) | | NO | 112 SLAVES (0x08 TO 0x77) | HIGH |
| CASE 3 | TYPE 1 | RESERVED(0x7E) | DYNAMIC ADDRESS, BUT A[6]:GROUP IDENTIFIER | YES | 112 SLAVES (0x08 TO 0x77) | MIDDLE |
| CASE 4 | TYPE 1 | A[6]=FIXED A[5:0]=DYNAMIC ADDRESS | | YES | 56 SLAVES (0x08 TO 0x3F) | SIGNIFICANTLY HIGH |

FIG. 21
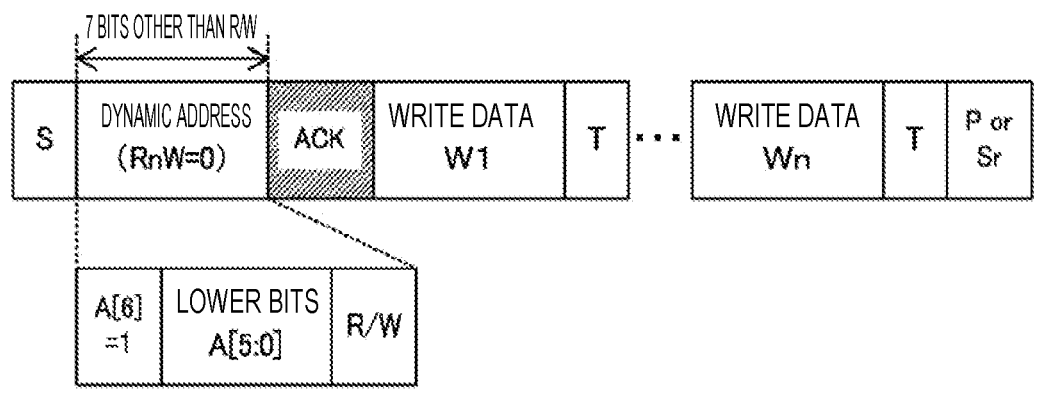
a
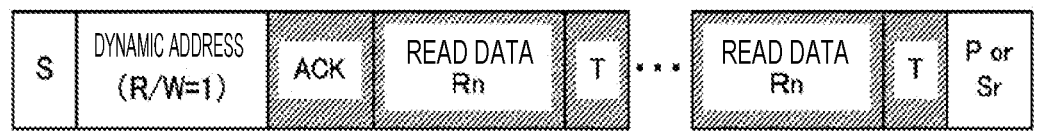
b

COMMUNICATION SYSTEM, COMMUNICATION SYSTEM CONTROL METHOD, AND PROGRAM

CROSS REFERENCE TO RELATED APPLICATIONS

The present application is a Continuation of U.S. patent application Ser. No. 16/162,767, filed Oct. 17, 2018, which is a Continuation of U.S. patent application Ser. No. 15/879,728, filed Jan. 25, 2018, now U.S. Pat. No.: 10,140,230, issued on Nov. 27, 2018, which is a Continuation of U.S. patent application Ser. No. 15/623,230, filed Jun. 14, 2017, now U.S. Pat. No. 9,916,271, issued on Mar. 13, 2018, which is a Continuation of U.S. patent application Ser. No. 15/063,992, filed Mar. 8, 2016, now U.S. Pat. No. 9,727,506, issued on Aug. 8, 2017, which claims the benefit of Japanese Priority Patent Application JP 2015-196191 filed Oct. 1, 2015, the entire contents of which are incorporated herein by reference.

BACKGROUND

The present technology relates to a communication system, a communication system control method, and a program causing a computer to execute the method, and specifically, to a communication system configured to transmit and receive data between a master and a slave, a communication system control method, and a program causing a computer to execute the method.

In the related art, when communication is performed between devices in a relatively short range, for example, within the same substrate, a communication standard of Inter-Integrated Circuit (I2C) is broadly used due to a simple configuration. In I2C, since a plurality of masters can transmit signals to one slave, it is necessary to detect collision of such signals and arbitrate the masters. For example, in the communication standard of I2C, an arbitration procedure in which, when one master transmits "1" and the other master transmits "0," the master that has transmitted "1" loses a control right is proposed (for example, refer to "UM10204 bus I²C bus specification and user manual Rev5.0J," [online], Oct. 9, 2012, NXP semiconductors, [Aug. 26, 2015, search], Internet (http://www.nxp.com/documents/user_manual/UM10204_JA.pdf)).

In addition, a communication standard of I3C, an extended version of I2C, is proposed. In I3C, three communication schemes are used. In the first communication scheme (hereinafter referred to as a "case 0"), it is possible to connect a maximum of 112 slaves to the master while arbitration is possible. In the second communication scheme (hereinafter referred to as a "case 1"), a higher communication rate than that of the case 0 is provided, but the number of connectable slaves is limited to a maximum of 56 while arbitration is possible. In the third communication scheme (hereinafter referred to as a "case 2"), a higher communication rate than that of the case 0 is provided, and it is possible to connect a maximum of 112 slaves, but it is not possible to arbitrate devices.

SUMMARY

In the related art described above, there is a problem in that it is difficult to optimize a system using I3C. For example, in the case 1, it is possible to increase a communication rate while arbitration is possible, but the number of connectable slaves is smaller than that of the case 0. In addition, in the case 2, it is possible to increase a communication rate while the number of slaves is the same as that of the case 0, but arbitration is not possible. In this manner, there is a problem in that it is difficult to optimize a system with a balance between the number of connectable slaves and a possibility of arbitration.

In view of such problems, the present technology is provided to optimize a system configured to transmit and receive data between a master and a slave.

The present technology has been made in order to solve the above-mentioned issues. According to a first embodiment of the present technology, there is provided a communication system, a control method thereof, and a program causing a computer to execute the method, the communication system including: a first slave device configured to transmit and receive data when a start bit indicating communication start, predetermined pattern data in which a specific value is set in a first bit, and a first address in which the specific value is set in a first bit are received; a second slave device configured to sequentially transmit the start bit and a second address in which a value different from the specific value is set in a first bit and transmit and receive data; and a master device configured to sequentially transmit the start bit, the predetermined pattern data, and any of the first address and the second address and arbitrates the second slave device and another device based on the first bit. Accordingly, there is provided an effect in which arbitration between the second slave device and another device is performed based on the first bits of the predetermined pattern data and the second address.

According to the first embodiment, the master device and the first and second slave devices may transmit and receive the data according to a communication standard of I3C. Accordingly, there is provided an effect in which data is transmitted and received according to the communication standard of I3C.

According to the first embodiment, the first slave device may store setting information indicating inclusion in a group for which arbitration is necessary, the second slave device may store the setting information indicating inclusion in a group for which arbitration is unnecessary, and the master device may allocate the first address to the first slave device and allocates the second address to the second slave device based on the setting information. Accordingly, there is provided an effect in which the first and second addresses are allocated based on the setting information indicating inclusion in a group for which an arbitration process is necessary.

According to the first embodiment, the first and second slave devices may store the setting information in a bus characteristic register. Accordingly, there is provided an effect in which the first and second addresses are allocated based on the setting information stored in the bus characteristic register.

According to e second embodiment of the present technology, there is provided a device to which an address in which inclusion or non-inclusion in a group for which arbitration is necessary is set in a first bit is allocated. Accordingly, there is provided an effect in which arbitration between the slave device and another device is performed based on the first bit.

According to a third embodiment of the present technology, there is provided a device including: a transmission unit configured to sequentially transmit a start bit indicating communication start, predetermined pattern data, and an address in which inclusion or non-inclusion in a group for which arbitration is necessary is set in a first bit; and an arbitration unit configured to arbitrate a slave device and another device based on the first bit. Accordingly, there is provided an effect in which arbitration between the slave device and another device is performed based on the first bit.

According to a fourth embodiment of the present technology, there is provided a communication system including: a slave device configured to sequentially transmit a start bit indicating communication start and a transmission source address in which a specific value is set in a first bit; and a master device configured to sequentially transmit the start bit and a transmission destination address in which a value that does not correspond to the specific value is set in a first bit and arbitrate the slave device and another device based on the first bit. Accordingly, there is provided an effect in which arbitration between the slave device and another device is performed based on the first bit of the address.

According to the fourth embodiment, the slave device may include an arbitration target slave device for which an arbitration process is necessary and an arbitration-unnecessary slave device for which an arbitration process is unnecessary, and the master device may allocate the address to the arbitration target device and allocate an address in which a bit string except for a first bit is different from a bit string of the arbitration target slave device to the arbitration-unnecessary device. Accordingly, there is provided an effect in which an address in which a bit string except for a first bit is different from a bit string of the arbitration target slave device is allocated to the slave device for which arbitration is unnecessary.

According to a fifth embodiment of the present technology, there is provided a device configured to sequentially transmit a start bit indicating communication start and a transmission source address in which a fixed value is set in a first bit. Accordingly, there is provided an effect in which arbitration between the slave device and another device is performed based on the first bit.

According to a sixth embodiment of the present technology, there is provided a device including: a transmission unit configured to sequentially transmit a start bit indicating communication start and a transmission destination address in which a fixed value is set in a first bit; and an arbitration unit configured to arbitrate a slave device and another device based on the first bit. Accordingly, there is provided an effect in which arbitration between the slave device and another device is performed based on the first bit.

According to the embodiments of the present technology, an excellent effect that it is possible to optimize a system configured to transmit and receive data between a master and a slave can be obtained. Note that effects described herein are not necessarily limiting, and any effect described in the present disclosure may be achieved.

BRIEF DESCRIPTION OF THE DRAWINGS

FIG. 4 is a diagram for describing a communication scheme in the first embodiment of the present technology;

FIG. 5 is a diagram for describing a header type in the first embodiment of the present technology;

FIG. 7 is a diagram illustrating an exemplary data structure of a frame that is transmitted by a master in a case 3 in the first embodiment of the present technology;

FIG. 9 is a diagram illustrating an example of setting information of a bus characteristic register in the first embodiment of the present technology;

FIG. 10 is a diagram illustrating exemplary details of indexes 0 to 3 in the first embodiment of the present technology;

FIG. 17 is a diagram illustrating an example of setting information of a bit characteristic register in a first modification of the first embodiment of the present technology;

FIG. 18 is a diagram illustrating an example of setting information of a bit characteristic register in a second modification of the first embodiment of the present technology;

FIG. 19 is a diagram illustrating an example of setting information of a bit characteristic register in a third modification of the first embodiment of the present technology;

FIG. 20 is a diagram for describing a communication scheme in a second embodiment of the present technology;

FIG. 21 is a diagram illustrating an exemplary data structure of a frame that is transmitted by a master in a case 4 in the second embodiment of the present technology;

DETAILED DESCRIPTION OF THE EMBODIMENT(S)

Hereinafter, forms (hereinafter referred to as "embodiments") for implementing the present technology will be described. The description will proceed in the following order.

1. First embodiment (an example in which a group identifier is set to a first bit)
2. Second embodiment (an example in which a fixed value is set to a first bit)

1. First Embodiment

Exemplary Configuration of Electronic Device

Figure 1:
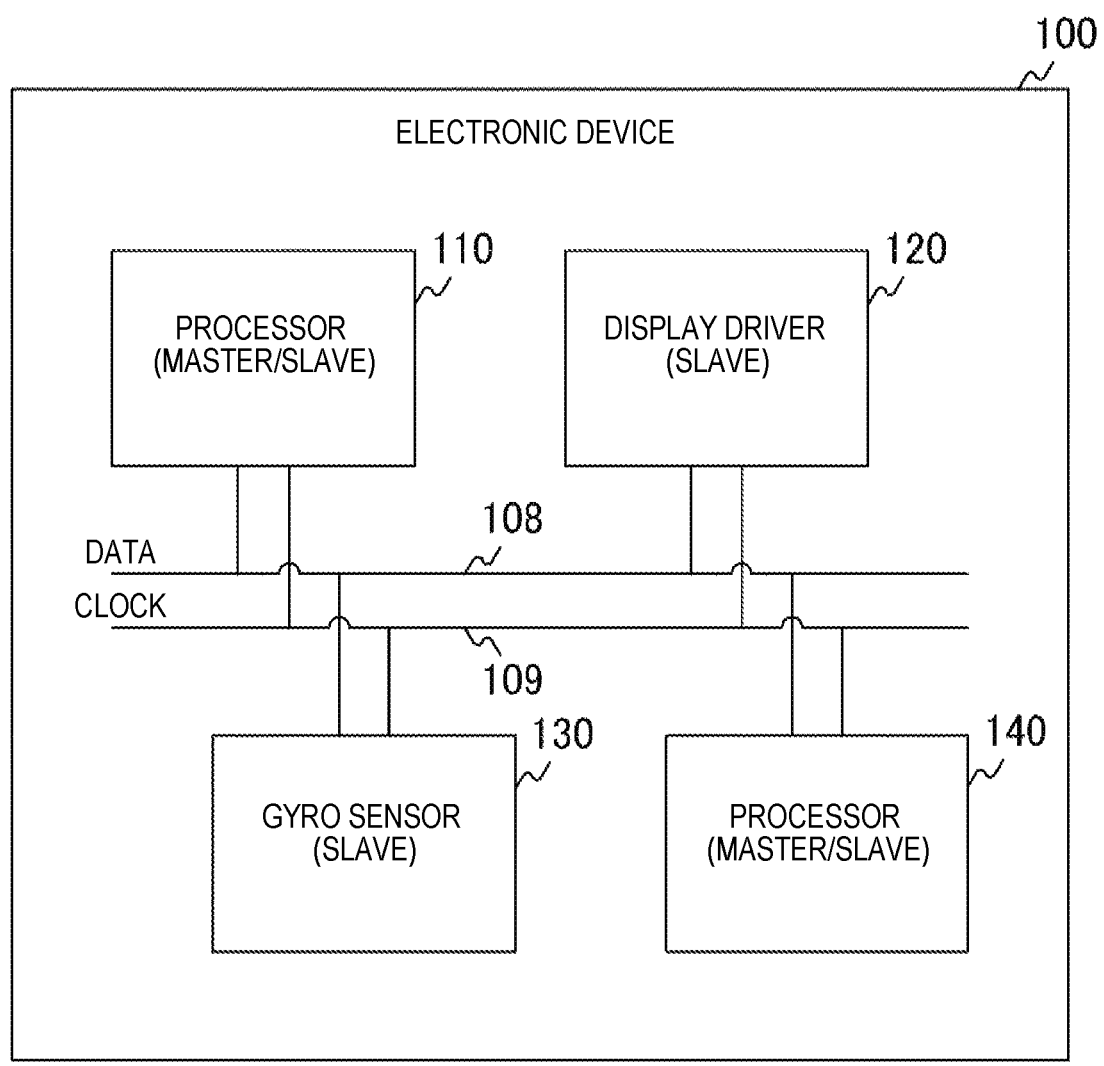
FIG. 1 is a block diagram illustrating an exemplary configuration of an electronic device in a first embodiment of the present technology.

FIG. 1 is a block diagram illustrating an exemplary configuration of an electronic device 100 in a first embodiment. The electronic device 100 includes processors 110 and 140, a display driver 120, a gyro sensor 130, a serial data (SDA) line 108, and a serial clock (SCL) line 109. The processor 110, the processor 140, the display driver 120 and the gyro sensor 130 are connected to the SDA line 108 and the SCL line 109, and transmit and receive signals through these signal lines according to a communication standard of I3C. Also, while four devices, the processor 110, the processor 140, the display driver 120 and the gyro sensor 130, are provided in the electronic device 100, the number of devices is not limited to 4.

The communication standard of I3C is a standard in which communication is performed through two signal lines, the SDA line 108 configured to transmit data and the SCL line 109 configured to transmit a clock signal. In the standard, the device (for example, the processor 110) is classified as a device that is operated as a master or a slave or a device that is operated as only a slave. For example, the processors 110 and 140 are operated as a master or a slave, and the display driver 120 and the gyro sensor 130 are operated as only a slave. Here, the master is a device configured to control the slave, and the slave is a device that is operated under control of the master.

In addition, in I3C, it is possible to connect a plurality of slaves to one master. In addition, a plurality of masters can transmit a signal to one slave. Hereinafter, such communication will be referred to as "multi-master communication." Further, slaves can communicate with each other without the master, and such communication is referred to as "peer-to-peer communication." In addition, while the SDA line 108 is in a communication state (busy) due to communication of other devices, the slave can perform communication by interrupting the communication. Such an interrupt is referred to as an "in-band interrupt."

In the multi-master communication, in-band interrupt, and peer-to-peer communication described above, there is concern about signals transmitted by a plurality of devices at the same time colliding in the SDA line 108. For example, while the master transmits a signal to a certain slave, if another slave performs the in-band interrupt and transmits a signal to the master, the signal from the master and the signal from the slave collide. Therefore, in I3C, the device has a function of detecting collision and arbitrating devices.

Note that, while all devices such as the processor 110 are disposed in one device, the present technology is not limited to this configuration. For example, the processor 110 may be disposed in the electronic device 100, and a sensor such as the gyro sensor 130 may be disposed outside the electronic device 100. Note that a system including devices such as the processor 110 is an exemplary communication system described in the appended claims.

Exemplary Configuration of Processor

Figure 2:
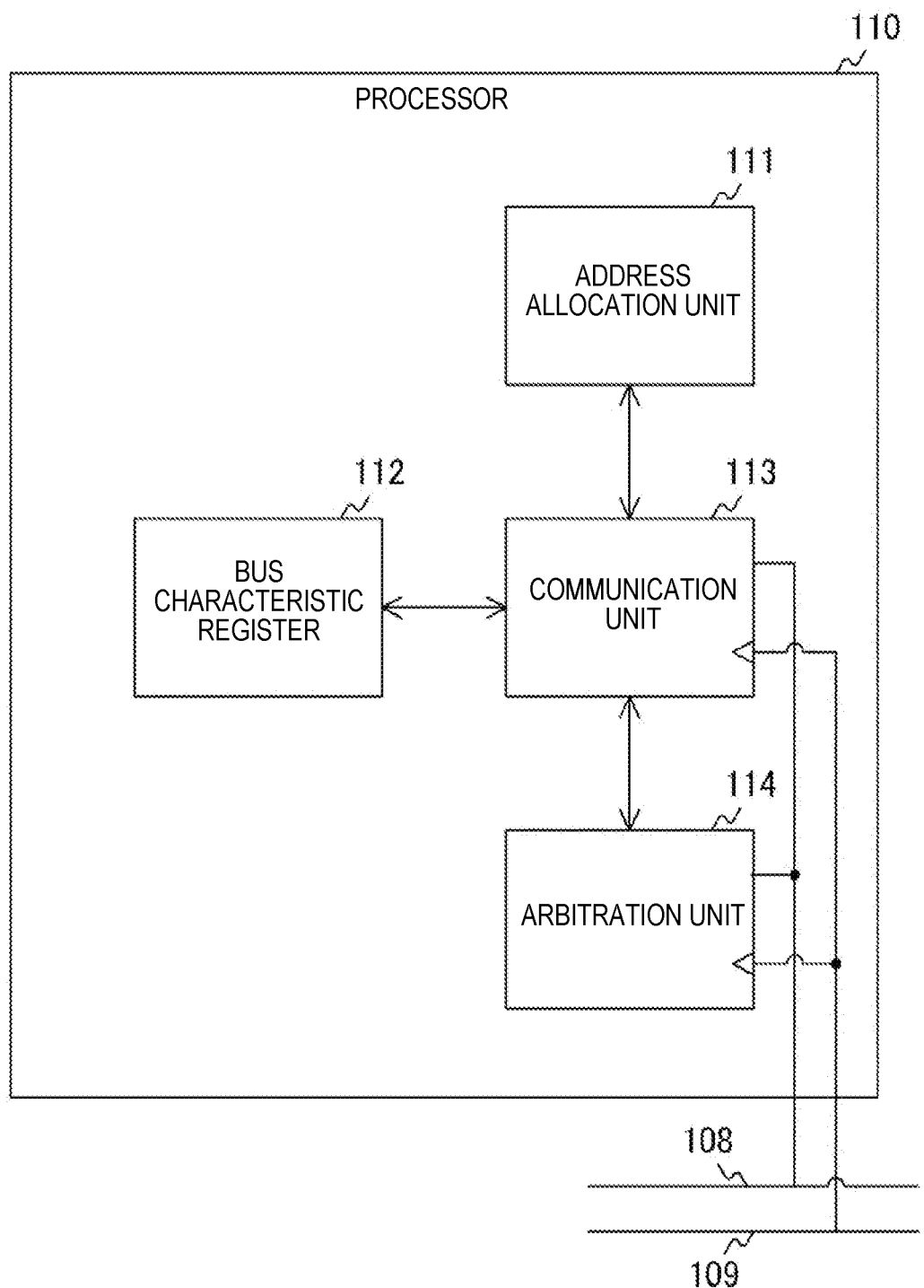
FIG. 2 is a block diagram illustrating an exemplary configuration of a processor in the first embodiment of the present technology.

FIG. 2 is a block diagram illustrating an exemplary configuration of the processor 110 in the first embodiment. The processor 110 includes an address allocation unit 111, a bus characteristic register 112, a communication unit 113 and an arbitration unit 114. The processor 140 has the same configuration as the processor 110. Note that the processor 110 is an example of the master device described in the appended claims.

The address allocation unit 111 allocates a dynamic address to the slave. The dynamic address is information for identifying the slave, and a unique address is allocated for each slave. The address allocation unit 111 starts dynamic address allocation (assignment) when power is applied to the electronic device 100. First, the address allocation unit 111 reads data from a bus characteristic register (BCR) of each device when allocation is performed. Here, the BCR is a register in which setting information necessary when the dynamic address is allocated such as a role of the device is stored and is a read-only register. Therefore, the address allocation unit 111 allocates the dynamic address for each slave based on the read setting information.

The bus characteristic register 112 stores setting information of the processor 110. The communication unit 113 performs communication as the master or the slave according to I3C. The communication unit 113 outputs data through any of an open drain circuit and a push-pull circuit. When communication is performed using the open drain circuit, a communication rate becomes lower than when communication is performed using the push-pull circuit due to characteristics of the circuit. For example, when the open drain circuit is used, data is transmitted in synchronization with a clock signal of 400 kilohertz (kHz). On the other hand, when the push-pull circuit is used, data is transmitted in synchronization with a clock signal of 12.5 megahertz (MHz).

The arbitration unit 114 detects collision and arbitrates devices. The arbitration unit 114 monitors a level of the SDA line 108, and when a value of a bit transmitted by the device (the processor 140) is different from a value of a bit in transmission using the SDA line 108, determines that there is collision. When arbitration is performed, for example, a device that has transmitted "0" has priority and a device that has transmitted "1" loses a control right.

Exemplary Configuration of Display Driver

Figure 3:
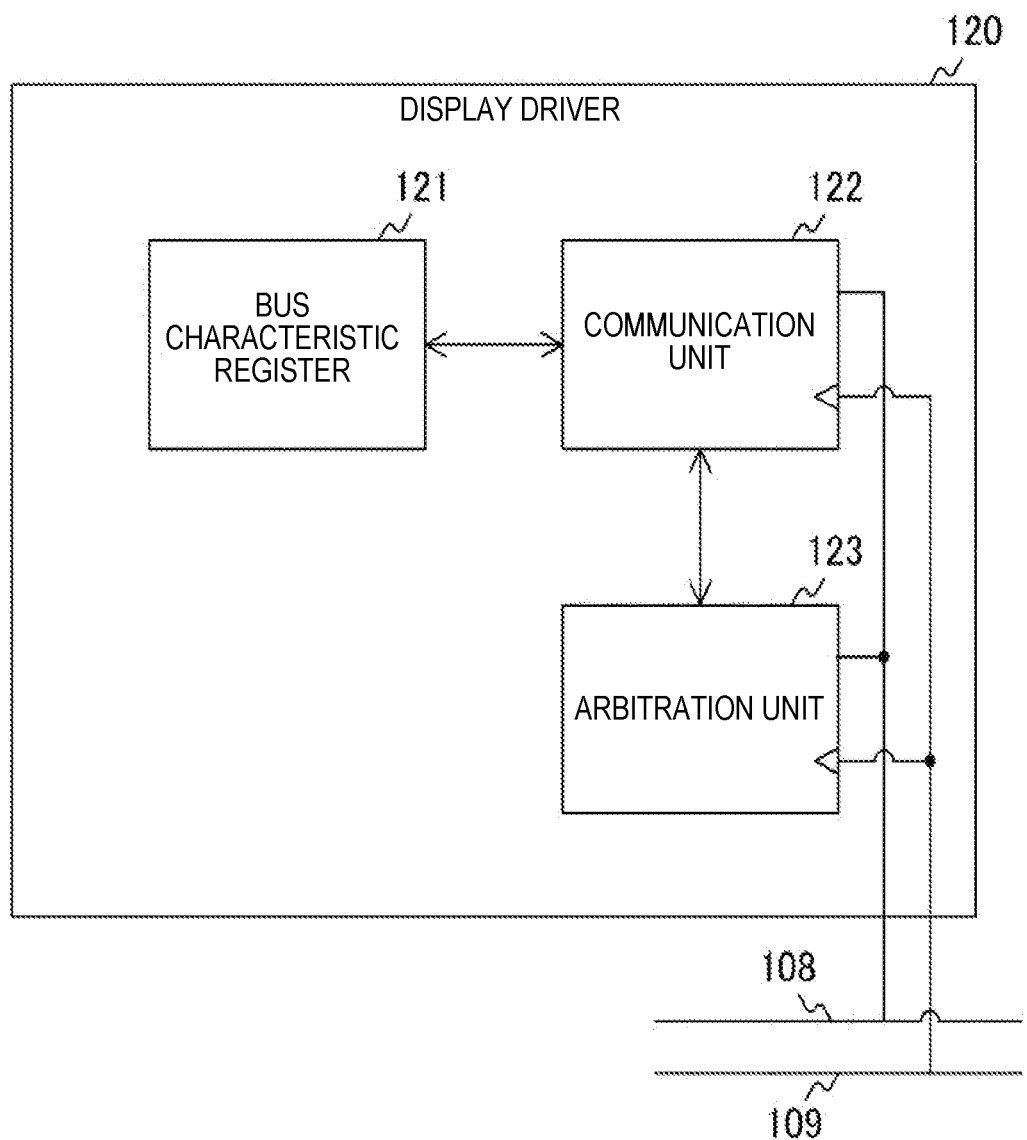
FIG. 3 is a block diagram illustrating an exemplary configuration of a display driver in the first embodiment of the present technology.

FIG. 3 is a block diagram illustrating an exemplary configuration of the display driver 120 in the first embodiment. The display driver 120 includes a bus characteristic register 121, a communication unit 122 and an arbitration unit 123. The gyro sensor 130 has the same configuration as the display driver 120.

The bus characteristic register 112 stores setting information of the display driver 120. The communication unit 122 performs communication as the slave according to I3C. The arbitration unit 123 detects collision and arbitrates devices.

FIG. 4 is a diagram for describing a communication scheme in the first embodiment. In I3C, three schemes are defined as communication schemes. Hereinafter, these schemes are referred to as a case 0, a case 1 and a case 2.

In the case 0, a header type of type 0 is set. In addition, in the case 0, a 7-bit fixed pattern data called "reserved" is first transmitted by the master. In the pattern data, for example, a hexadecimal value of "7E" (a binary value of "1111110") is set. Next, a 7-bit dynamic address allocated to an access destination slave is transmitted by the master. It is possible to connect a maximum of 112 slaves to the master using the 7-bit dynamic address.

In addition, a transmission source device in the type 0 transmits the reserved using the open drain circuit. When the open drain circuit is used, since the communication rate decreases as described above, the device can detect collision in units of bits and perform arbitration.

Next, in the case 1, a header type of type 1 is set. In addition, similarly to the case 0, in the case 1, the reserved is first transmitted by the master. Next, a 7-bit dynamic address whose first bit A[6] is fixed to "0" is transmitted by the master.

Here, in the case 1, the first bit of the dynamic address is fixed to "0" so that the device detects collision in the first bit. In the case 1, a slave that performs the in-band interrupt or the like first transmits a dynamic address whose first bit is "0." On the other hand, the master first transmits a reserved whose first bit is "1" as described above. In this manner, since values of the first bits are different, the device can perform arbitration by monitoring a level of the SDA line 108 and detecting whether collision has occurred when the first bit is transmitted. However, since the first bit is fixed to "0," a size of the address that is substantially available is reduced to 6 bits from 7 bits, and the number of slaves is reduced by half from a maximum of 112 to a maximum of 56.

In the above type 1, in order to detect collision, the first bit is transmitted by the open drain circuit having a relatively low communication rate. When there is no collision, second and subsequent bits are transmitted by the push-pull circuit having a relatively high communication rate. Accordingly, an overall communication rate of the case 1 is higher than that of the case 0.

Next, in the case 2, a header type of type 1 is set. In addition, in the case 2, a 7-bit dynamic address is first transmitted by the master without transmitting the reserved. In addition, in the case 2, the device is unable to perform arbitration. Since the device does not perform arbitration, the first bit of the dynamic address is not set as a fixed value, and the number of connectable slaves is 112, similarly to the case 0. Further, since no reserved is transmitted, the case 2 has a higher communication rate than either of the cases 0 and 1.

In summary, the case 1 has a smaller number of slaves and a higher communication rate than the case 0. In addition, the case 2 has the same number of slaves as the case 0 and has a higher communication rate than the case 0, but arbitration is not possible. In this manner, all schemes have advantages and disadvantages.

Here, in the electronic device 100, a case 3 in which the communication rate is the same as that of the case 1, arbitration is possible, and the number of slaves is greater than that of the case 1 is newly implemented.

In the case 3, a header type of a reserved is set as a type 1. In addition, similarly to the case 0, in the case 1, the reserved is first transmitted by the master. Next, a 7-bit dynamic address whose first bit A[6] is set as a group identifier is transmitted by the master.

Here, the group identifier is a bit indicating whether the slave belongs to a group for which arbitration is necessary. In I3C, the group identifier can be set in the BCR such that a signal (for example, the in-band interrupt) that may collide with a signal from another device can be transmitted by the slave and it is possible to set such that a signal can be transmitted only under control of the master. With reference to setting of the BCR, the master classifies a slave that can transmit a signal for which collision may occur as a group for which arbitration is necessary and classifies the other slaves as a group for which arbitration is unnecessary. The group identifier of the group for which arbitration is necessary is set to "0." The group identifier of the group for which arbitration is unnecessary is set to "1."

A first bit (a group identifier) of a dynamic address of a slave for which arbitration is necessary is "0." Since this value is different from the first bit (="1") of the reserved, the device detects collision in the first bit and can perform arbitration, similarly to the case 1.

On the other hand, a first bit (a group identifier) of a dynamic address of a slave for which arbitration is not necessary is "1." While this value is the same as that of the first bit of the reserved, since the slave is unable to transmit the dynamic address, it is irrelevant to collision.

As described above, in the case 3, since the first bit of the dynamic address may not be fixed, the number of connectable slaves is greater than that of the case 1 in which it is necessary to fix the first bit. In addition, since the header type is the type 1, the communication rate is higher than that of the case 0, similarly to the case 1.

Note that the slave (for example, the display driver 120) in the group for which arbitration is necessary is an example of the first slave device described in the appended claims. The slave in the group for which arbitration is not necessary is an example of the second slave device described in the appended claims.

Each of the devices (for example, the processor 110) in the electronic device 100 appropriately selects any of the above cases 0 to 3 depending on a situation and performs communication with other devices.

FIG. 5 is a diagram for describing a header type in the first embodiment. FIG. 5a is a diagram illustrating an exemplary state of the SDA line 108 and the SCL line 109 when a header (a reserved) of the type 0 is transmitted. FIG. 5b is a diagram illustrating an exemplary state of the SDA line 108 and the SCL line 109 when a header of the type 1 is transmitted. A[6] to A[0] indicate 7 bits of the reserved. In the reserved, A[6] is transmitted first and A[0] is transmitted last. In addition, R/W is a read-write bit indicating any of data write and read.

When communication starts, the master sets the SDA line 108 to a low level and the SCL line 109 to a high level. This state is referred to as a start condition S. The master sequentially transmits A[6] to A[0] and R/W in synchronization with a clock signal following the start condition S (a start bit).

Here, in the type 0, all bits are transmitted by the open drain circuit having a low communication rate. On the other hand, in the type 1, only the first bit A[6] is transmitted by the open drain circuit, and second and subsequent bits are transmitted by the push-pull circuit having a high communication rate. In addition, in the type 0, a communication rate of all bits is low but arbitration is performed for each bit. On the other hand, in the type 1, arbitration is performed only in the first bit, but if there is no collision in the first bit, a communication rate of second and subsequent bits becomes higher than that of the type 0. Note that, when collision occurs in the first bit of the type 1, the device transmits second and subsequent bits by the open drain circuit and performs arbitration for each bit.

Data Structure of Frame

Figure 6:
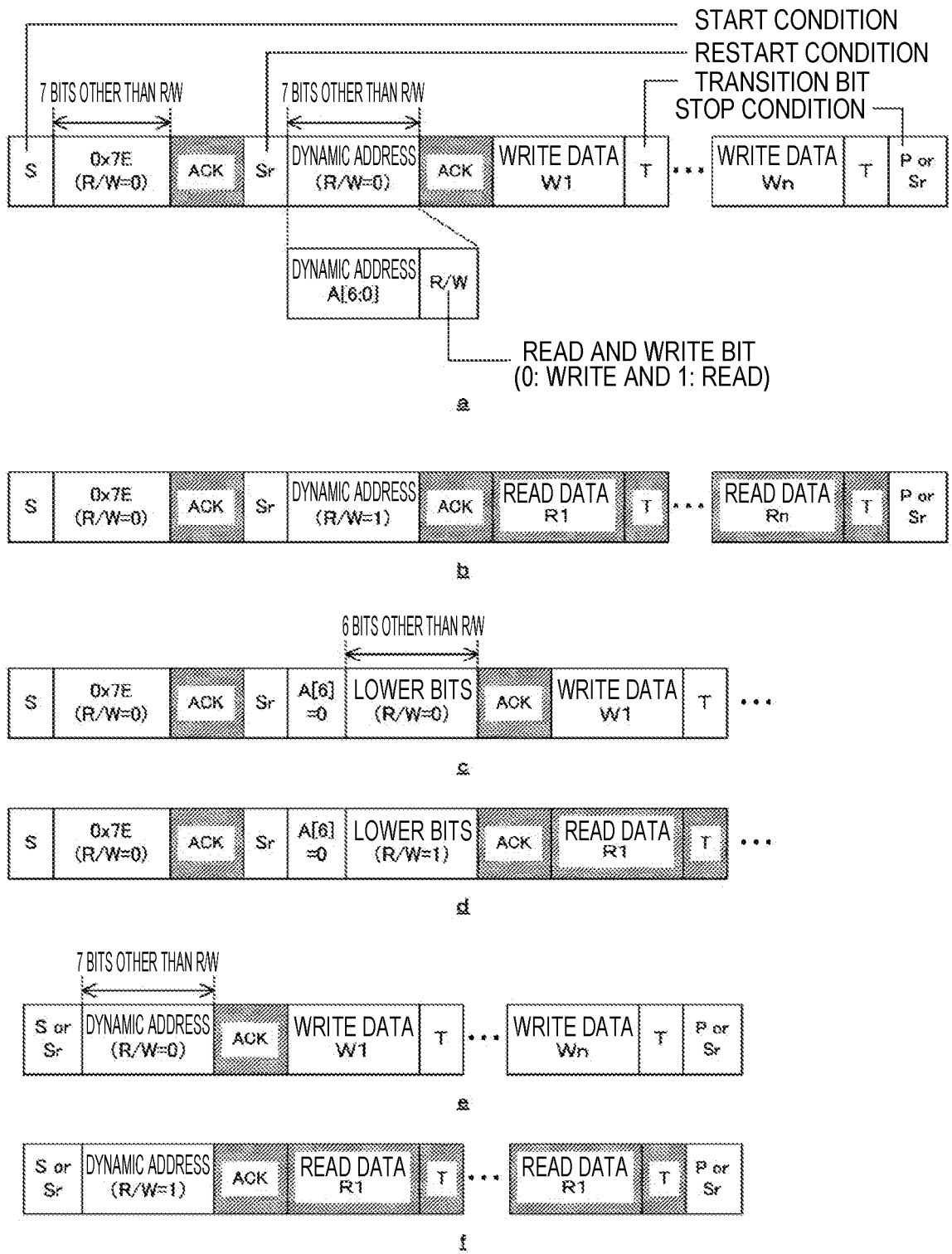
FIG. 6 is a diagram illustrating an exemplary data structure of a frame that is transmitted by a master in cases 0 to 2 in the first embodiment of the present technology.

FIG. 6 is a diagram illustrating an exemplary data structure of a frame that is transmitted by the master in the cases 0 to 2 in the first embodiment. Here, the frame refers to a signal including a dynamic address, and data transmitted and received by a slave having the dynamic address. FIG. 6a illustrates an exemplary configuration of a frame that is transmitted when the master performs write in the case 0. FIG. 6b illustrates an exemplary configuration of a frame that is transmitted when the master performs read in the case 0. FIG. 6c illustrates an exemplary configuration of a frame that is transmitted when the master performs write in the case 1. FIG. 6d illustrates an exemplary configuration of a frame that is transmitted when the master performs read in the case 1. FIG. 6e illustrates an exemplary configuration of a frame that is transmitted when the master performs write in the case 2. FIG. 6f illustrates an exemplary configuration of a frame that is transmitted when the master performs read in the case 2. In addition, in FIG. 6, a white rectangle indicates a signal that is transmitted from the master to the slave, and a shaded rectangle indicates a signal that is transmitted from the slave to the master.

In the case 0, the start condition S is first transmitted from the master, and a reserved having a hexadecimal value of "7E" and a read-write bit R/W are sequentially transmitted from the master. Then, when the slave has successfully received, an acknowledge (ACK) is transmitted from the slave. Following the ACK, a restart condition Sr is transmitted by the master, and a dynamic address and a read-write bit R/W are sequentially transmitted. Then, when the slave has successfully received these, an ACK is transmitted from the slave. Following the ACK, read data or write data is transmitted and received between the master and the slave. The data is transmitted in units of bytes, and a parity called a transition bit T is added to each byte. When the data is completely transmitted and received, a stop condition P or the restart condition Sr is transmitted by the master.

Next, in the case 1, similarly to the case 0, following the start condition S, the reserved is transmitted from the master, and the ACK is transmitted from the slave. Following the ACK, the restart condition Sr is transmitted by the master, and a dynamic address whose first bit A[6] is set to "0" and a read-write bit R/W are sequentially transmitted. Then, the ACK is transmitted from the slave, and read data or write data is transmitted and received between the master and the slave. When the data is completely transmitted and received, the stop condition P or the restart condition Sr is transmitted by the master.

Next, in the case 2, following the start condition S, the dynamic address is transmitted from the master, and the ACK is transmitted from the slave. Following the ACK, read data or write data is transmitted and received between the master and the slave. When the data is completely transmitted and received, the stop condition P or the restart condition Sr is transmitted by the master.

FIG. 7 is a diagram illustrating an exemplary data structure of a frame that is transmitted by the master in the case 3 in the first embodiment. FIG. 7a illustrates an exemplary configuration of a frame that is transmitted when the master performs write in the case 3. FIG. 7b illustrates an exemplary configuration of a frame that is transmitted when the master performs read in the case 3.

In the case 3, similarly to the case 0, following the start condition S, the reserved is transmitted from the master, and the ACK is transmitted from the slave. Following the ACK, the restart condition Sr is transmitted by the master, and the dynamic address whose first bit A[6] is set as a group identifier and a read-write bit R/W are sequentially transmitted. In the group identifier, when the slave belongs to an arbitration target group for which arbitration is necessary, "0" is set, and when the slave belongs to an arbitration-unnecessary group, "1" is set.

Then, the ACK is transmitted from the slave, and read data or write data is transmitted and received between the master and the slave. When the data is completely transmitted and received, the stop condition P or the restart condition Sr is transmitted by the master.

Unlike the case 1 in which a fixed value is set in the first bit of the dynamic address, since the first bit of the dynamic address is not necessarily set as the fixed value in the case 3, it is possible to connect a greater number of slaves to the master than in the case 1. In addition, since a value different from the first bit of fixed pattern data (reserved) is set in the first bit A[6] of the dynamic address of the arbitration target group, the device can detect collision in the first bit and perform arbitration.

Figure 8:
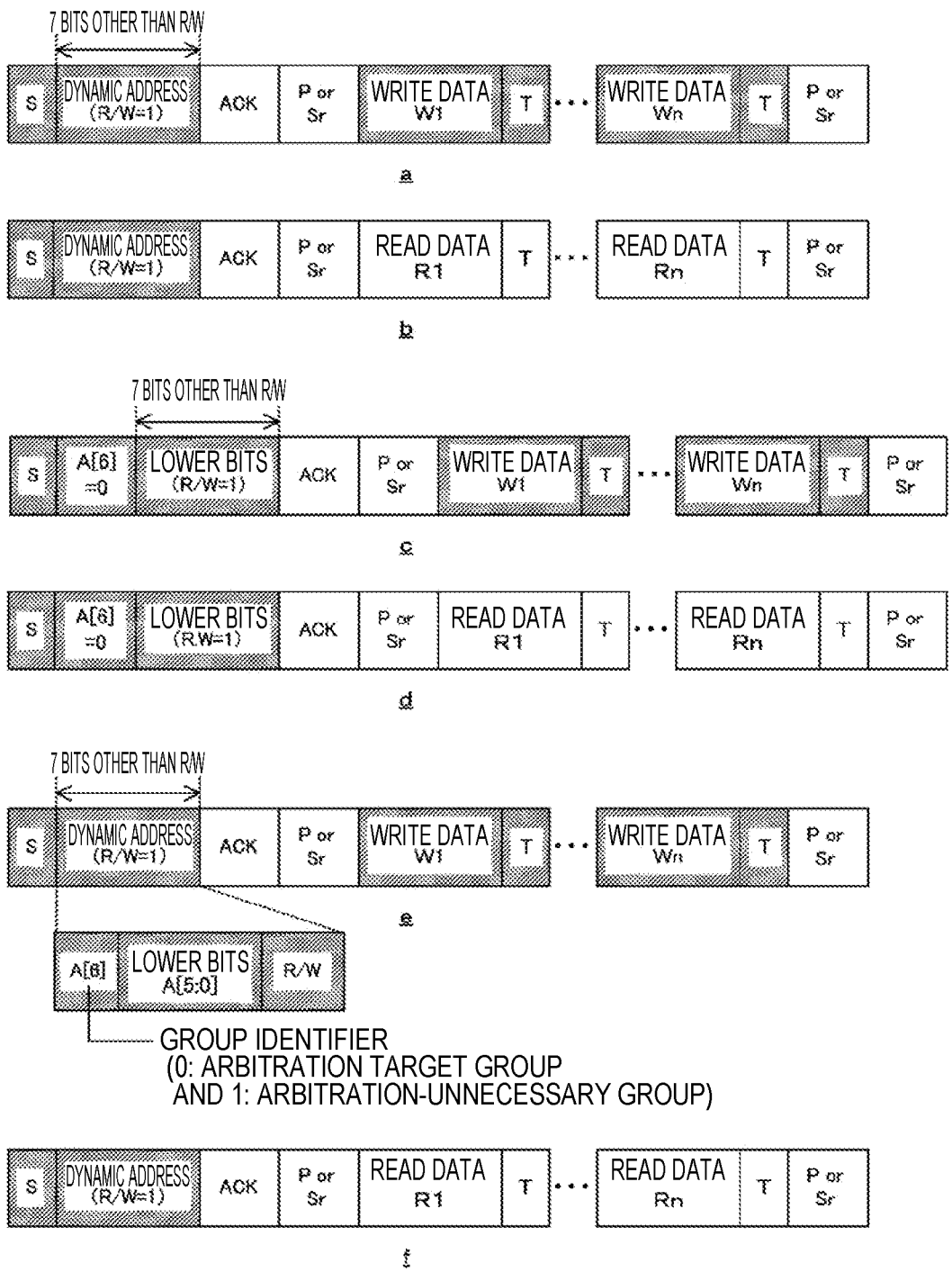
FIG. 8 is a diagram illustrating an exemplary data structure of a frame that is transmitted by a slave in the first embodiment of the present technology.

FIG. 8 is a diagram illustrating an exemplary data structure of a frame that is transmitted by the slave in the first embodiment. FIG. 8a illustrates an exemplary configuration of a frame that is transmitted when the slave performs write by the in-band interrupt or the like in the case 0. FIG. 8b illustrates an exemplary configuration of a frame that is transmitted when the slave performs read by the in-band interrupt or the like in the case 0. FIG. 8c illustrates an exemplary configuration of a frame that is transmitted when the slave performs write by the in-band interrupt or the like in the case 1. FIG. 8d illustrates an exemplary configuration of a frame that is transmitted when the slave performs read by the in-band interrupt or the like in the case 1. FIG. 8e illustrates an exemplary configuration of a frame that is transmitted when the slave performs write by the in-band interrupt or the like in the case 3. FIG. 8f illustrates an exemplary configuration of a frame that is transmitted when the slave performs read by the in-band interrupt or the like in the case 3. Note that, in the case 2, the slave does not transmit the dynamic address to the master. This is because the device is unable to perform arbitration in the case 2.

In the case 0, when the in-band interrupt or the like occurs, the start condition S and the dynamic address are transmitted by the slave, and the ACK is transmitted by the master. Following the ACK, the restart condition Sr is transmitted by the master, and read data or write data is transmitted and received between the master and the slave. Also, immediately after the ACK is transmitted, the master may transmit the stop condition P.

In the case 1, when the in-band interrupt or the like occurs, the start condition S and the dynamic address whose first bit A[6] is fixed to "0" are transmitted by the slave, and the ACK is transmitted by the master. Following the ACK, the restart condition Sr is transmitted by the master and read data or write data is transmitted and received between the master and the slave.

In the case 3, when the in-band interrupt or the like occurs, following the start condition S, the dynamic address whose first bit A[6] is set as a group identifier is transmitted from the slave, and the ACK is transmitted by the master. Since "0" is set to the group identifier in the slave that performs the in-band interrupt or the like, the device detects whether collision has occurred, similarly to the case 1. In addition, following the ACK, the restart condition Sr is transmitted by the master, and read data or write data is transmitted and received between the master and the slave.

FIG. 9 is a diagram illustrating an example of setting information of the bus characteristic register 112 in the first embodiment. BCR[7] to BCR[0] are stored in the bus characteristic register 112. Here, BCR[i] (i is an integer of 0 to 7) indicates an i-th bit. Such a bit includes setting information indicating whether the slave belongs to the group for which arbitration is necessary. In FIG. 9, parts surrounded by dotted lines indicate parts of specifications of I3C that are modified according to addition of the case 3.

In BCR[7] and BCR[6], a role (a device role) allocated to the device in the system such as the master or the slave is set. When the device is a secondary master, a binary value of "01" is set. When the device is a slave that performs peer-to-peer communication, a binary value of "10" is set. In addition, in BCR[1] and BCR[6], any of indexes 0 to 3 indicating whether the device performs the in-band interrupt and setting content related to a clock frequency is set.

FIG. 10 is a diagram illustrating exemplary details of the indexes 0 to 3 in the first embodiment. In FIG. 10, parts surrounded by dotted lines and a bold frame parts indicate parts of specifications of I3C that are modified according to addition of to the case 3. The index 0 indicates that an in-band interrupt request is performed and it is possible to set the clock frequency to the maximum. The index 1 indicates that the in-band interrupt request is performed and it is not possible to set the clock frequency to the maximum. The index 2 indicates that no in-band interrupt request is performed and it is not possible to set the clock frequency to the maximum. The index 3 indicates that no in-band interrupt request is performed and it is possible to set the clock frequency to the maximum.

Based on the setting information of FIGS. 9 and 10, when the device role is "01" or "10," or the index is 0 or 1, the master determines the device as a slave for which arbitration is necessary and sets the group identifier as "0."

Exemplary Operation of Device

Figure 11:
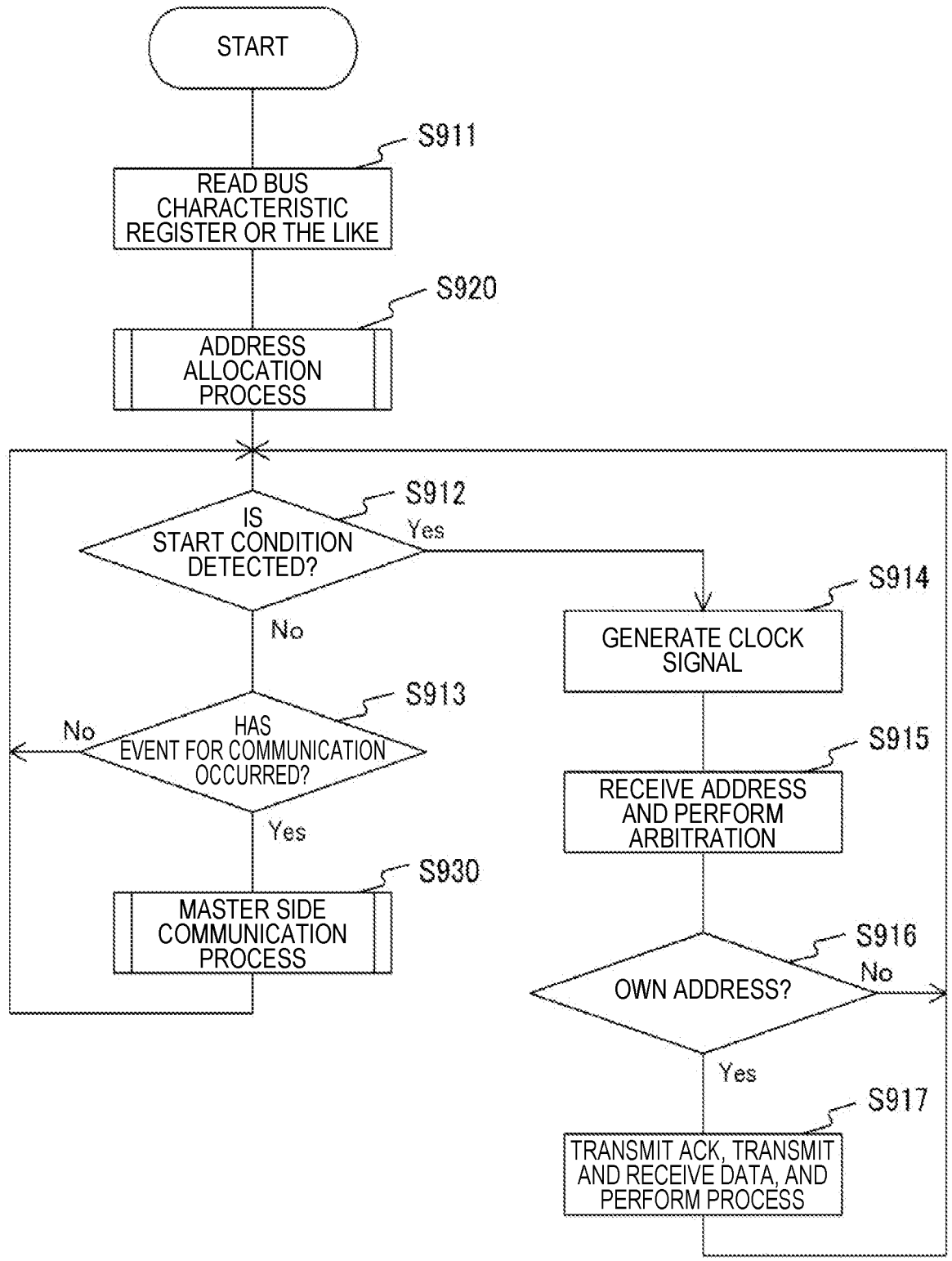
FIG. 11 is a flowchart illustrating exemplary operations of a master/slave device in the first embodiment of the present technology.

FIG. 11 is a flowchart illustrating exemplary operations of a master/slave device (for example, the processor 110) in the first embodiment. The operation starts when, for example, power is applied to the electronic device 100. The device reads a bus characteristic register or the like from each slave (Step S911), and performs an address allocation process for allocating a dynamic address (Step S920).

Then, the device determines whether a start condition generated by another device is detected (Step 912). When the start condition is not detected (No in Step S912), the device determines whether a predetermined event for communication has occurred (Step S913). When the event has occurred (Yes in Step S913), the device performs a master side communication process (Step S930). When the event has not occurred (No in Step S913) or after Step S930, the device repeats processes after Step S912.

On the other hand, when the start condition is detected (Yes in Step S912), the master starts generation of a clock signal (Step S914), receives a dynamic address, and performs arbitration when collision has occurred (Step S915). Then, the master determines whether the received address is allocated to the master itself (Step S916). When an own address is received (Yes in Step S916), the device transmits an ACK, transmits and receives data, and performs a process of the received data (Step S917). When the own address is not received (No in Step S916), or after Step S917, the device repeats processes after Step S912.

Figure 12:
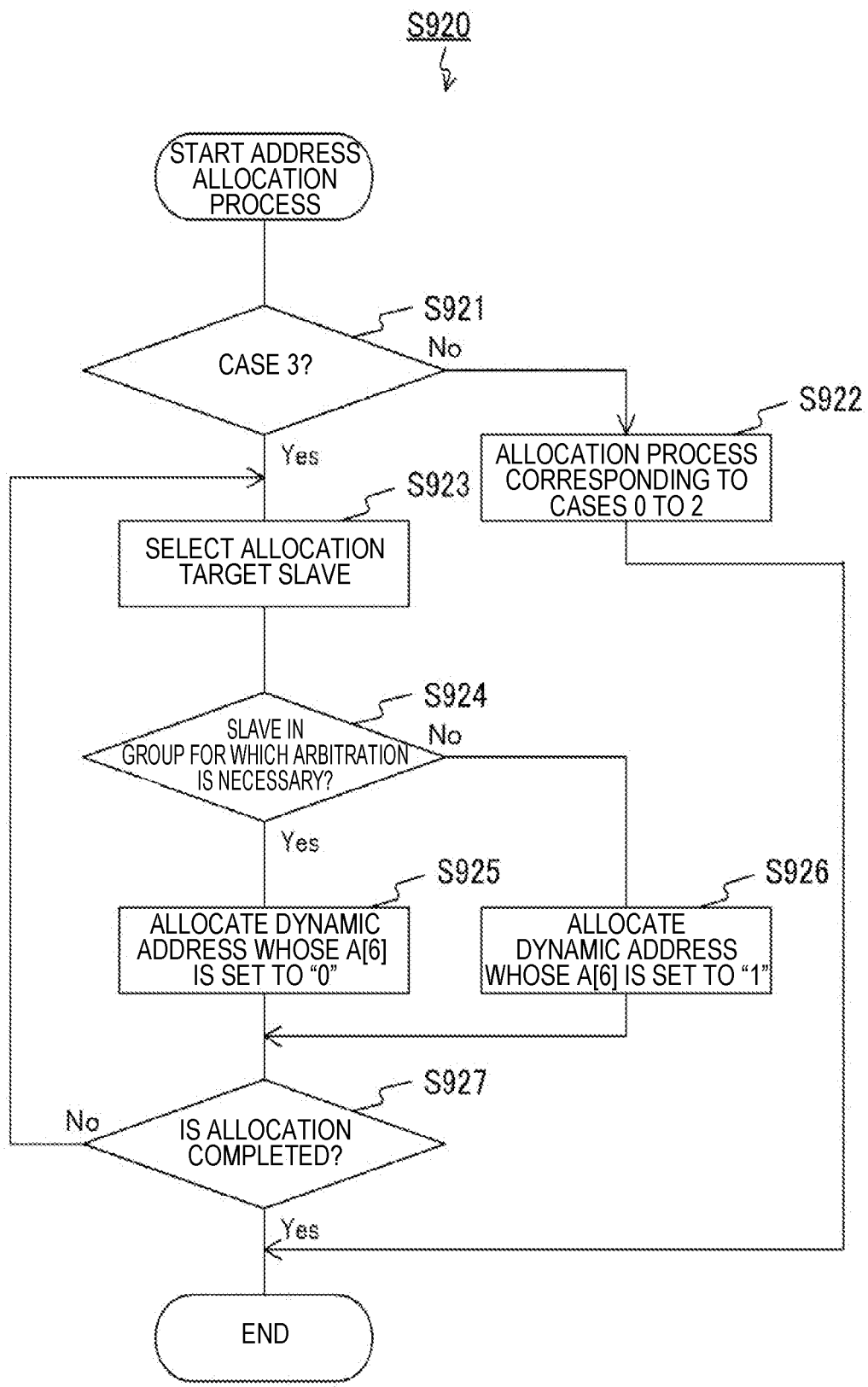
FIG. 12 is a flowchart illustrating an exemplary address allocation process in the first embodiment of the present technology.

FIG. 12 is a flowchart illustrating an exemplary address allocation process of the case 3 in the first embodiment. The device determines whether a current communication scheme is the case 3 (Step S921). When the current communication scheme is not the case 3 (No in Step S921), the device performs a dynamic address allocation process corresponding to any of the cases 0 to 2 as the master (Step S922), and ends the address allocation process.

When the current communication scheme is the case 3 (Yes in Step S921), the device selects an allocation target slave as the master (Step S923), and determines whether the slave is a slave in the group for which arbitration is necessary based on the BCR (Step S924). When the slave is in the group for which arbitration is necessary (Yes in Step S924), the device allocates a dynamic address whose first bit A[6] is set to "0" (Step S925). On the other hand, when the slave is not in the group for which arbitration is necessary (No in Step S924), the device allocates a dynamic address whose first bit A[6] is set to "1" (Step S926). After Step S925 or S926, the device determines whether addresses of all slaves are completely allocated (Step S927). When allocation is not completed (No in Step S927), the device repeats processes after Step S923. When allocation is completed (Yes in Step S927), the address allocation process ends.

Figure 13:
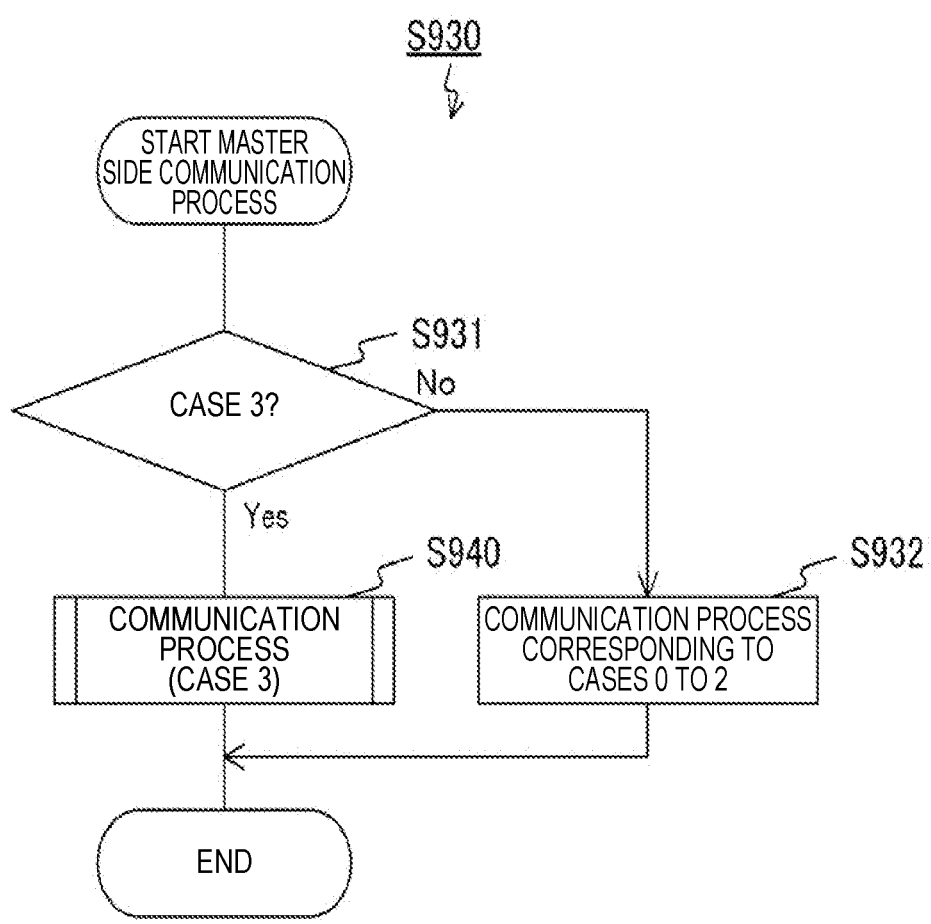
FIG. 13 is a flowchart illustrating an exemplary master side communication process in the first embodiment of the present technology.

FIG. 13 is a flowchart illustrating an exemplary master side communication process in the first embodiment. The device determines whether the current communication scheme is the case 3 (Step S931). When the current communication scheme is the case 3 (Yes in Step S931), the device performs a communication process corresponding to the case 3 (Step S940). On the other hand, when the current communication scheme is not the case 3 (No in Step S931), the device performs a communication process corresponding to any of the cases 0 to 2 (Step S932). After Step S940 or S932, the device ends the master side communication process.

Figure 14:
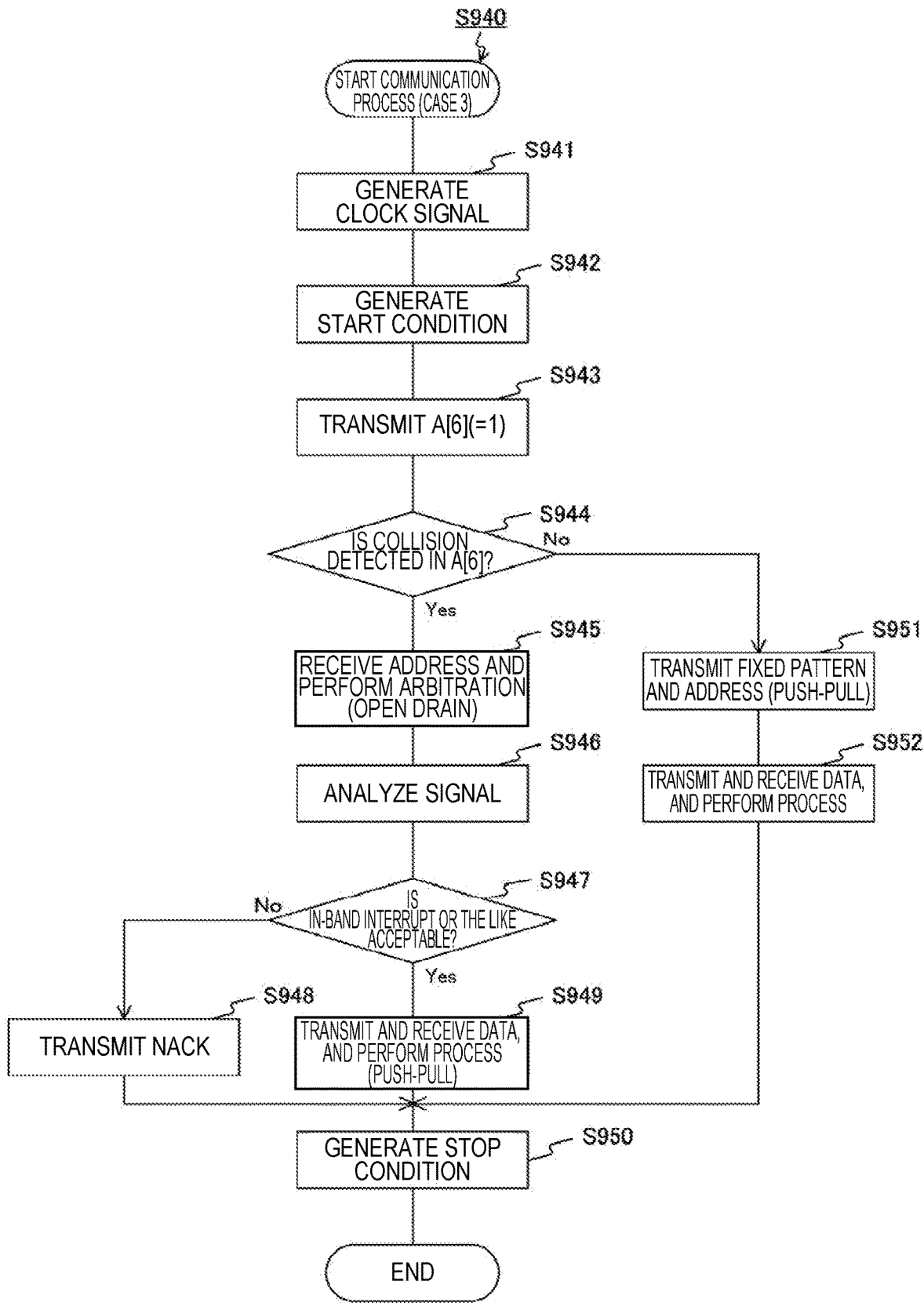
FIG. 14 is a flowchart illustrating an exemplary master side communication process corresponding to the case 3 in the first embodiment of the present technology.

FIG. 14 is a flowchart illustrating an exemplary master side communication process corresponding to the case 3 in the first embodiment. The device starts generation of a clock signal as the master (Step S941), and generates a start condition (Step S942). Then, the device transmits a first bit A[6](=1) of pattern data (reserved) (Step S943), and determines whether collision has occurred in the bit (Step S944). Since the first bit of the pattern data is "1," when a dynamic address whose first bit is "0" is transmitted by the slave, the master can determine that collision has occurred. In order to transmit the first bit, the open drain circuit having a low communication rate is used.

When collision has occurred (Yes in Step S944), the master loses a control right, stops transmission to the SDA line 108, receives an address of second and subsequent bits from another slave, and performs arbitration in units of bits (Step S945). Here, in order to transmit the address, the open drain circuit having a low communication rate is used.

The device analyzes which of multi-master communication, peer-to-peer communication, and in-band interrupt has occurred based on the received signal (Step S946). In addition, the device determines as the master whether the in-band interrupt is acceptable (Step S947). When the in-band interrupt is acceptable (Yes in Step S947), the master transmits an ACK, transmits and receives data, and performs a process of the received data (Step S948). Such data is transmitted by the push-pull circuit. On the other hand, when the in-band interrupt is unacceptable (No in Step S947), the master transmits a NACK (Step S948).

On the other hand, when no collision has occurred (No in Step S944), the device transmits second and subsequent bits of the pattern data (reserved), and a dynamic address of an access destination (Step S951). In order to transmit such data, the push-pull circuit having a relatively high communication rate is used. Therefore, the device transmits and receives data and performs a process of the received data (Step S952). After Step S948, S949 or S952, the device generates a stop condition (Step S951), and ends the master side communication process of the case 3.

Figure 15:
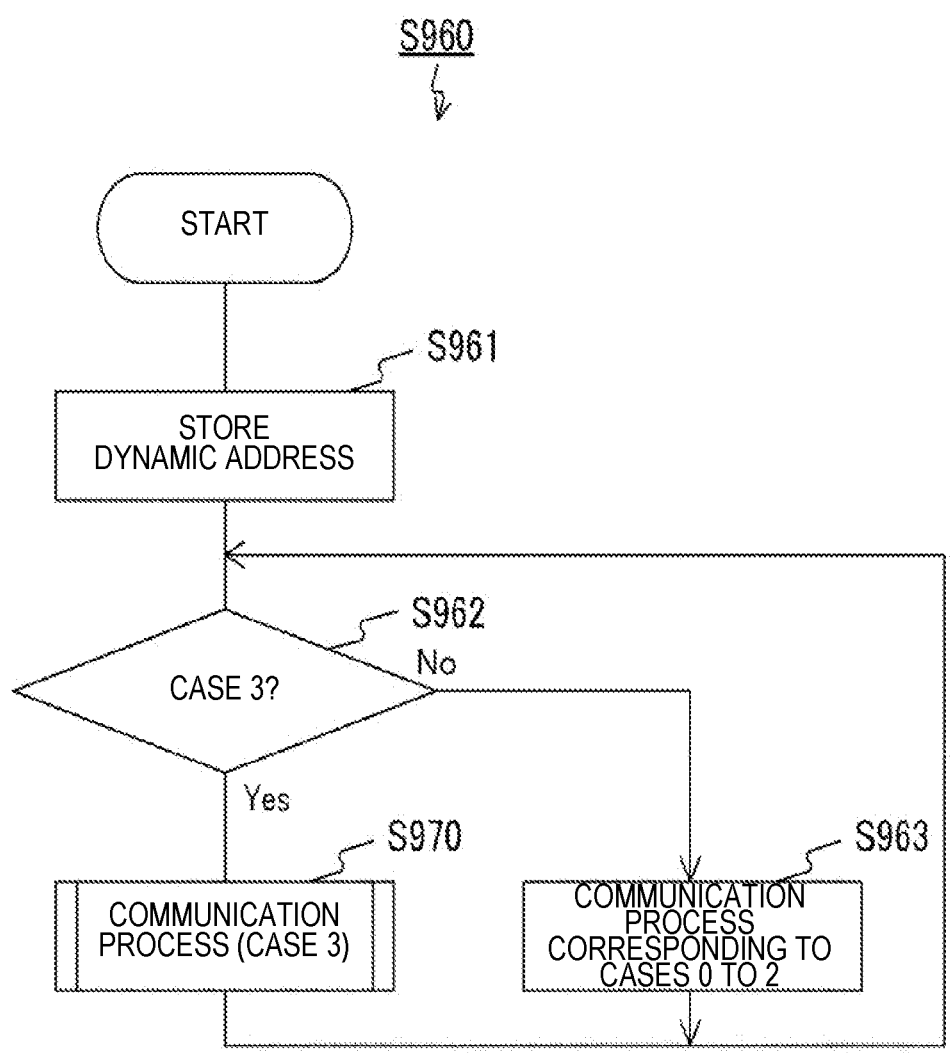
FIG. 15 is a flowchart illustrating an exemplary operation of a slave in the first embodiment of the present technology.

FIG. 15 is a flowchart illustrating an exemplary operation of the slave (for example, the display driver 120) in the first embodiment. The operation starts when, for example, power is applied to the electronic device 100. The slave stores the dynamic address allocated by the master (Step S961), and determines whether the current communication scheme is the case 3 (Step S962). When the current communication scheme is the case 3 (Yes in Step S962), the slave performs a slave side communication process of the case 3 (Step S970), and repeats processes after Step S962. On the other hand, when the current communication scheme is not the case 3 (No in Step S962), the slave performs a communication process corresponding to any of the cases 0 to 2 (Step S963), and repeats processes after Step S962.

Figure 16:
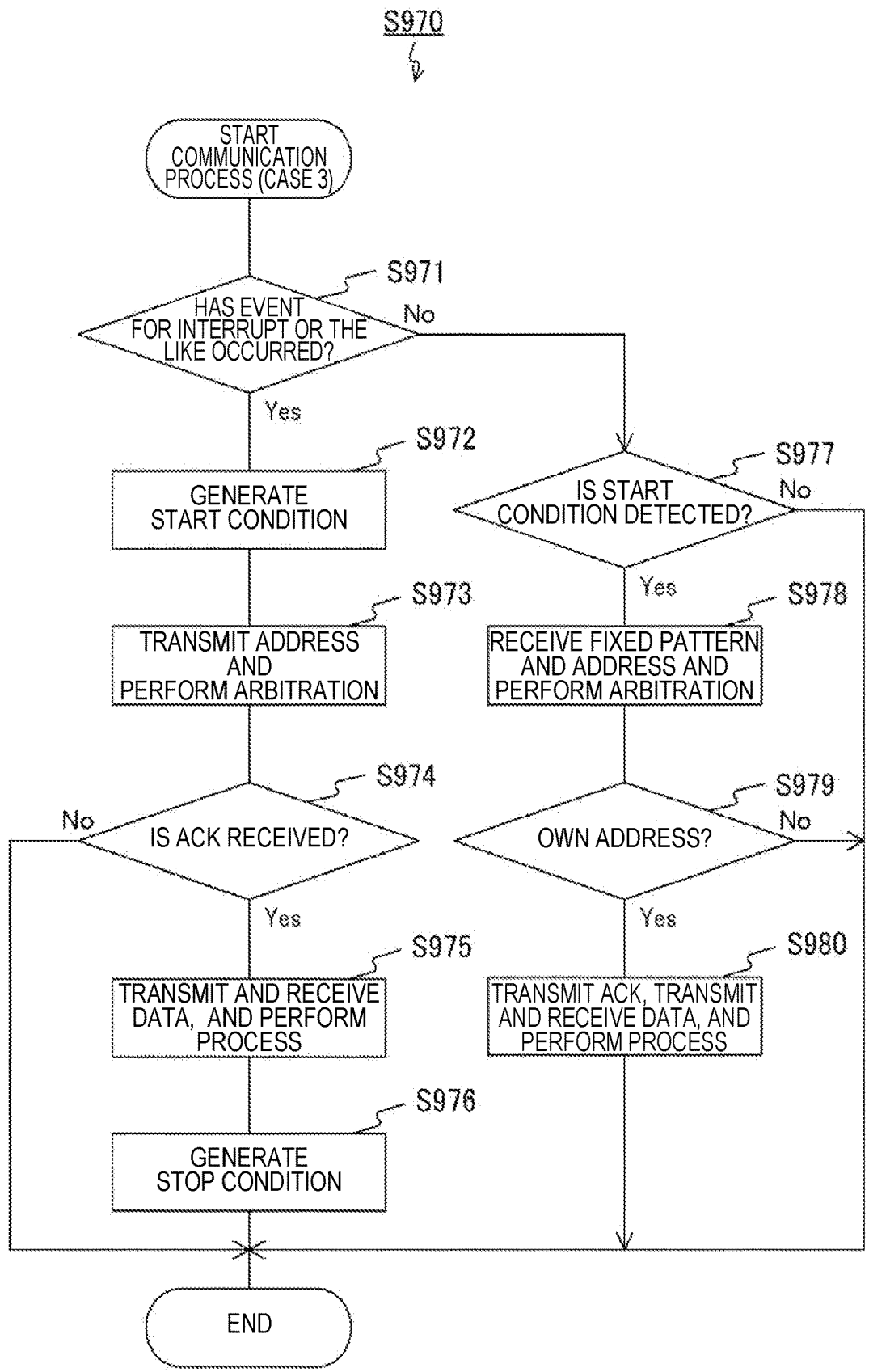
FIG. 16 is a flowchart illustrating an exemplary slave side communication process corresponding to the case 3 in the first embodiment of the present technology.

FIG. 16 is a flowchart illustrating an exemplary slave side communication process corresponding to the case 3 in the first embodiment. The device determines whether a predetermined event for the in-band interrupt or peer-to-peer communication has occurred (Step S971).

When the event for the in-band interrupt or the like has occurred (Yes in Step S971), the slave generates a start condition (Step S972). Then, the slave transmits an own dynamic address and performs arbitration when collision has occurred (Step S973). The slave determines whether an ACK is received (Step S974). When the ACK is received (Yes in Step S974), the slave transmits and receives data and performs a process of the received data (Step S975), and generates a stop condition (Step S976). When no ACK is received (No in Step S974), or after Step S976, the slave ends the slave side communication process of the case 3.

On the other hand, when no event for the in-band interrupt or the like has occurred (No in Step S971), the slave determines whether a start condition generated by another device is detected (Step S977). When the start condition is detected (Yes in Step S977), the slave receives a fixed pattern and a dynamic address, and performs arbitration when collision has occurred (Step S978). Therefore, the device determines whether the received address is the own address (Step S979). When the own address is received (Yes in Step S979), the device transmits and receives data and performs a process of the received data (Step S980). When no start condition is detected (No in Step S977), when the own address is not received (No in Step S979), or after Step S980, the slave ends the communication process.

In this manner, according to the first embodiment of the present technology, since the address in which a value different from the first bit of the pattern data is set to the first bit is allocated to the slave that performs the interrupt or the like, it is possible to detect whether collision has occurred in each first bit of the pattern data and the address. Accordingly, the device that has detected collision can arbitrate devices that have transmitted the signal that has collided. In addition, since the first bit of the address is not a fixed value, it is possible to connect a greater number of slaves than in the case 1 in which the first bit is set as a fixed value.

First Modification

While details of the indexes 0 to 3 of the BCR are modified according to addition of the case 3 in the above first embodiment, the master can alternatively modify other parts of the BCR. For example, a device role of the reserved in the BCR can be used. The electronic device 100 in a first modification of the first embodiment is different from that of the first embodiment in that the device role of the reserved in the BCR is modified.

FIG. 17 is a diagram illustrating an example of setting information of the bus characteristic register 112 in the first modification of the first embodiment. In FIG. 17, a part surrounded by a dotted line indicates a part of specifications of I3C that is modified according to addition of the case 3.

In BCR[6] and BCR[7], the reserved is set in "11." However, in the first modification, the role is modified to a slave that does not request any of the in-band interrupt, a secondary master request, and a peer to peer slave request.

The master of the first modification determines a slave in which "11" is set in BCR[7] and BCR[6] in the case 3 as a "slave for which arbitration is not necessary" and determines the other slaves as "slaves for which arbitration is necessary."

In this manner, according to first modification of the first embodiment of the present technology, since only the device role of the reserved is modified to the slave for which arbitration is not necessary, it is possible to reduce the number of parts to be modified compared to when the indexes 0 to 3 are modified.

Second Modification

While details of the indexes 0 to 3 of the BCR are modified according to addition of the case 3 in the above first embodiment, the master can alternatively modify other parts of the BCR. For example, the device role of the reserved in the BCR can be used. The electronic device 100 in a second modification of the first embodiment is different from that of the first embodiment in that the device role of the reserved in the BCR is modified.

FIG. 18 is a diagram illustrating an example of setting information of the bus characteristic register 112 in the second modification of the first embodiment. In FIG. 18, a part surrounded by a dotted line indicates a part of specifications of I3C to that is modified according to addition of the case 3.

In BCR[6] and BCR[7], the reserved is set in "11." However, in the second modification, the role is modified to a slave that requests the in-band interrupt.

In the second modification, the master determines a slave in which "01" (a secondary master), "10" (a peer to peer slave), or "11" (a slave that performs the in-band interrupt) is set in BCR[7] and BCR[6] in the case 3 as a "slave for which arbitration is necessary." On the other hand, a slave in which "00" is set in CR[6] and BCR[7] is determined as a "slave for which arbitration is not necessary." In this manner, in the first modification, the slave for which arbitration is not necessary is allocated to the device role ("11") of the reserved. On the other hand, in the second modification, the slave for which arbitration is necessary is allocated to "11." In addition, in the first modification, the slave for which arbitration is necessary is allocated to "00." On the other hand, in the second modification, the slave for which arbitration is not necessary is allocated to "00."

In this manner, according to the second modification of the first embodiment of the present technology, since only the device role of the reserved is modified to the slave for which arbitration is necessary, it is possible to reduce the number of parts to be modified compared to when the indexes 0 to 3 are modified.

Third Modification

While details of the indexes 0 to 3 of the BCR are modified according to addition of the case 3 in the above first embodiment, the master can alternatively modify other parts of the BCR. For example, the number of bits allocated to the device role in the BCR increased from 2 bits to 3 bits, and empty parts can be used. The electronic device 100 in a third modification of the first embodiment is different from that of the first embodiment in that the number of bits allocated to the device role in the BCR is increased.

FIG. 19 is a diagram illustrating an example of setting information of the bus characteristic register 112 in the third modification of the first embodiment. In FIG. 19, parts surrounded by bold lines and dotted lines indicate parts of specifications of I3C that are modified according to addition of the case 3.

Bits allocated to the device role are modified from BCR [6] and BCR[7] to BCR[5] to BCR[7]. According to such a modification, the modification is performed such that information set in BCR[5] to [2] before modification is moved to BCR[4] to [1]. In addition, in BCR[0], a possibility of setting a maximum SCL clock frequency is set.

In BCR[5] to BCR[7], a binary value of "000" indicates that the device is an I2C slave, and "100" indicates that the device is an I2C secondary master. In addition, "010" indicates that the device is a peer to peer I3C slave, and "001" indicates that the device is a slave that performs the in-band interrupt. The reserved is set in the others.

In the third modification, the master determines a slave in which "100," "100," or "010" is set in BCR[5] to BCR[7] in the case 3 as a "slave for which arbitration is necessary." On the other hand, a slave in which "000" is set as a "slave for which arbitration is not necessary."

In this manner, according to the third modification of the first embodiment of the present technology, since the number of bits allocated to the device role increases, an area of the reserved increases, and thus it is possible to correspond to an extension of the device role in the future.

2. Second Embodiment

In the above first embodiment, the address having a first bit different from that of the fixed pattern is allocated to the slave that performs the interrupt or the like. Accordingly, the communication rate increases and the number of devices increases, compared to the case 0. However, a system that desires a higher communication rate than that of the case 0 and a possibility of arbitration rather than the increased number of devices is assumed. A second embodiment is different from the first embodiment in that the electronic device 100 has a higher communication rate than that of the case 0 and is able to arbitrate.

FIG. 20 is a diagram for describing a communication scheme in the second embodiment. In the second embodiment, a case 4 is added in addition to the cases 0 to 3.

In the case 4, a header type of type 1 is set. In addition, in the case 4, similarly to the case 2, a 7-bit dynamic address is transmitted by the master following a start condition without transmitting a fixed pattern of a reserved. However, an arbitration bit is set in the first bit of the dynamic address. In the arbitration bit, a fixed value of "1" is set on the master side, and a fixed value of "0" is set on the slave side.

In the case 4, since a fixed value is set in the first bit, a size of the address that is substantially available is reduced to 6 bits from 7 bits, and the number of slaves is reduced by half from a maximum of 112 to a maximum of 56. On the other hand, since different fixed values are set in the first bits on the master side and the slave side, the device can detect collision in the first bit and perform arbitration. In addition, since transmission of the reserved is unnecessary, the case 4 has a higher communication rate than the case 0, the case 1, or the case 3 in which transmission of the reserved is necessary.

In this manner, compared to the case 0, in the case 4, the maximum number of slaves is reduced by half, but the communication rate can increase while arbitration is possible.

FIG. 21 is a diagram illustrating an exemplary data structure of a frame that is transmitted by the master in the case 4 in the second embodiment. In the case 4, following the start condition S, a dynamic address is transmitted from the master, and an ACK is transmitted from the slave. "1" is set in the first bit (the arbitration bit) of the dynamic address. On the other hand, "0" is set in the first bit of the dynamic address that is transmitted by the slave.

In addition, in the second embodiment, in the case 4, the master allocates the dynamic address in the same procedure as in the case 1. That is, the first bit of the dynamic address of the slave is fixed to "0."

However, if an arbitration-unnecessary slave that does not perform the in-band interrupt or the like is connected, when one of the master and the slave accesses the slave, the other of the master and the slave may erroneously determine that the access is directed to itself. For example, a case in which only a first bit is different between an address of the arbitration-unnecessary slave and an address of the master or slave, and 6 lower bits are the same is assumed. In such a configuration, when the control right is lost, since the first bit (the arbitration bit) is set from "1" to "0," the master or slave erroneously determines the address transmitted to the arbitration-unnecessary slave as its own address.

In order to prevent such an erroneous operation, in the second embodiment, it is preferable that the master allocate an address whose 6 lower bits are different from a dynamic address of an arbitration target slave that performs the in-band interrupt or the like to the arbitration-unnecessary slave.

Figure 22:
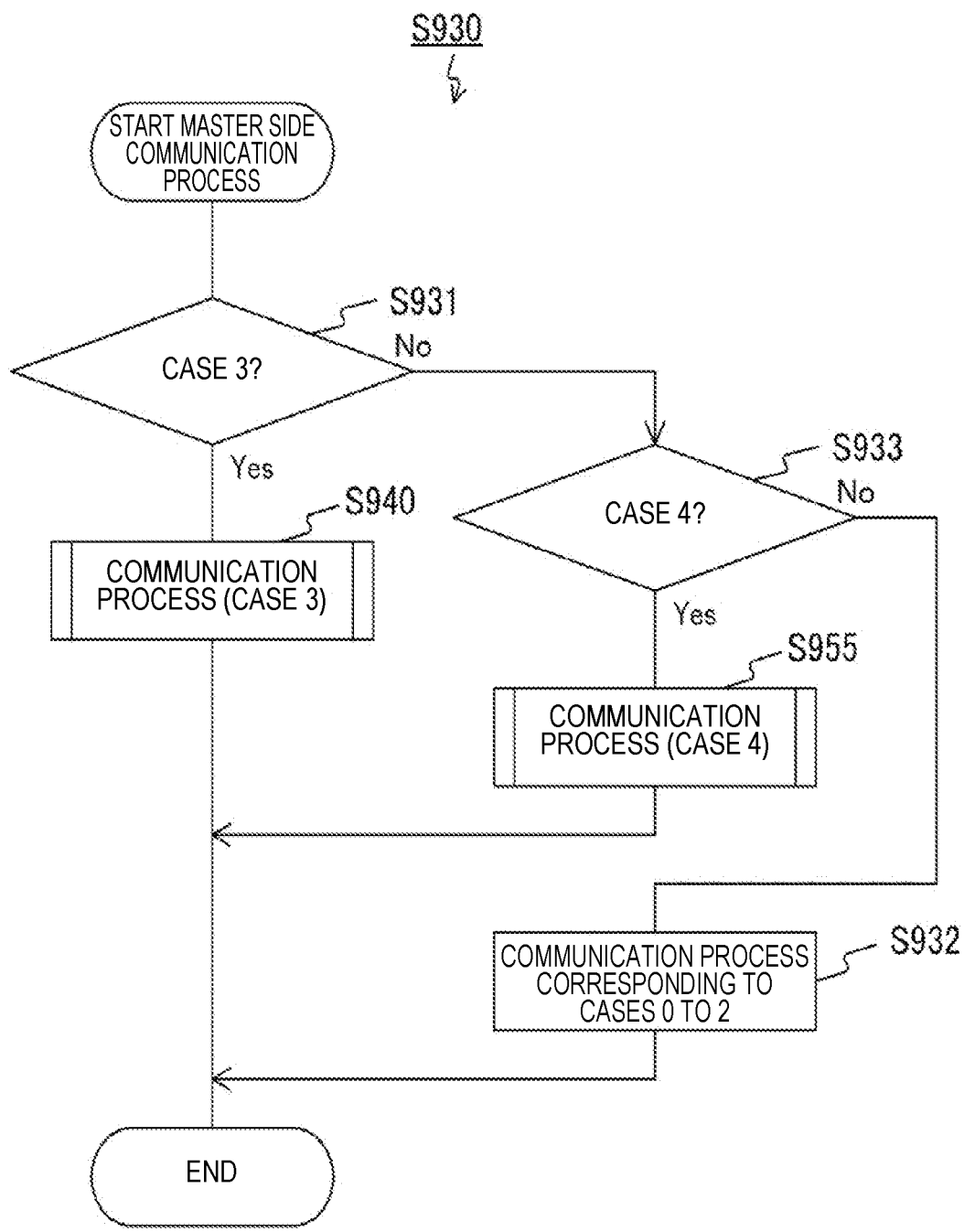
FIG. 22 is a flowchart illustrating an exemplary master side communication process in the second embodiment of the present technology.

FIG. 22 is a flowchart illustrating an exemplary master side communication process in the second embodiment. The communication process of the second embodiment is different from that of the first embodiment in that Steps S933 and S955 are further performed.

When the current communication scheme is not the case 3 (No in Step S931), the device determines whether the current communication scheme is the case 4 (Step S933). When the current communication scheme is the case 4 (Yes in Step S933), the device performs a master side communication process corresponding to the case 4 (Step S955), and ends the master side communication process. On the other hand, when the current communication scheme is not the case 4 (No in Step S933), the device performs Step S932.

Figure 23:
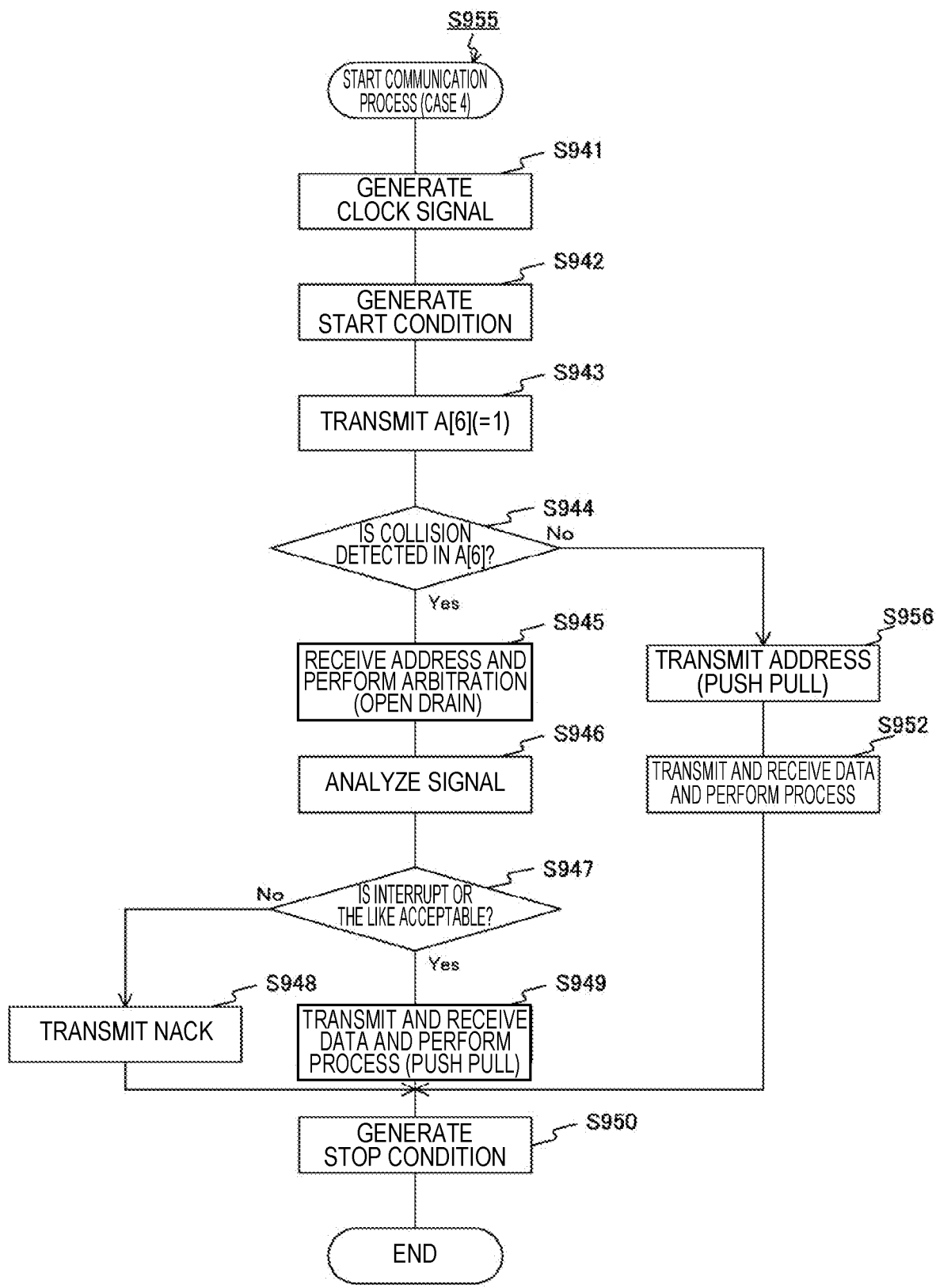
FIG. 23 is a flowchart illustrating an exemplary master side communication process corresponding to the case 4 in the second embodiment of the present technology.

FIG. 23 is a flowchart illustrating an exemplary master side communication process corresponding to the case 4 in the second embodiment. The communication process of the case 4 is the same as the communication process of the case 3 except that Step S956 is performed in place of Step S949.

When no collision has occurred in the first bit A[6] (No in Step S944), the device transmits second and subsequent bits of the address by the push-pull circuit (Step S956), and performs processes after Step S950.

Figure 24:
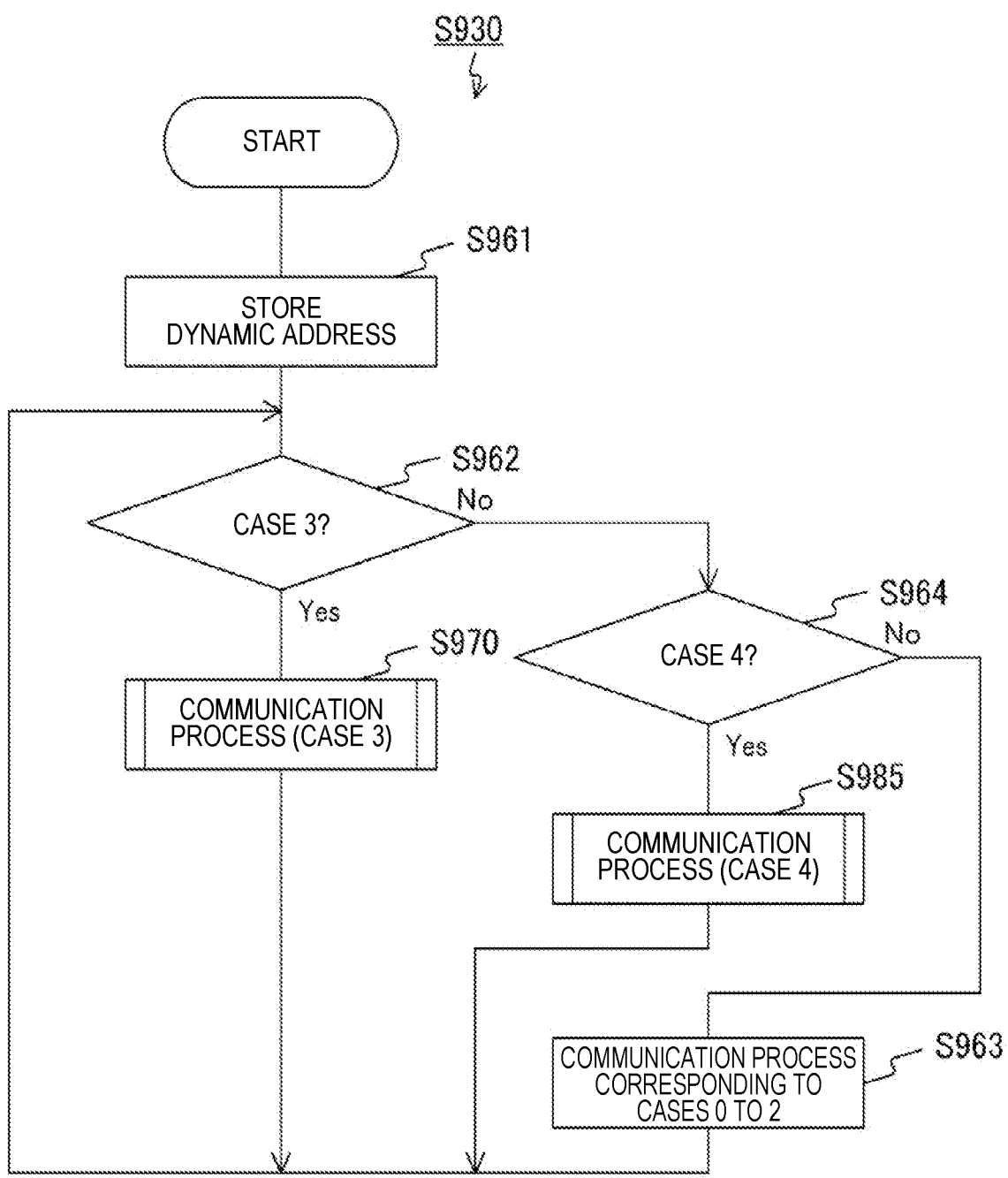
FIG. 24 is a flowchart illustrating an exemplary slave operation in the second embodiment of the present technology.

FIG. 24 is a flowchart illustrating an exemplary slave side communication process in the second embodiment. The slave side communication process of the second embodiment is different from that of the first embodiment in that Steps S964 and S985 are further performed.

When the current communication scheme is not the case 3 (No in Step S962), the device determines whether the current communication scheme is the case 4 (Step S964). When the current communication scheme is the case 4 (Yes in Step S964), the device performs a slave side communication process corresponding to the case 4 (Step S985), and repeats processes after Step S962. On the other hand, when the current communication scheme is not the case 4 (No in Step S964), the device performs Step S963.

Figure 25:
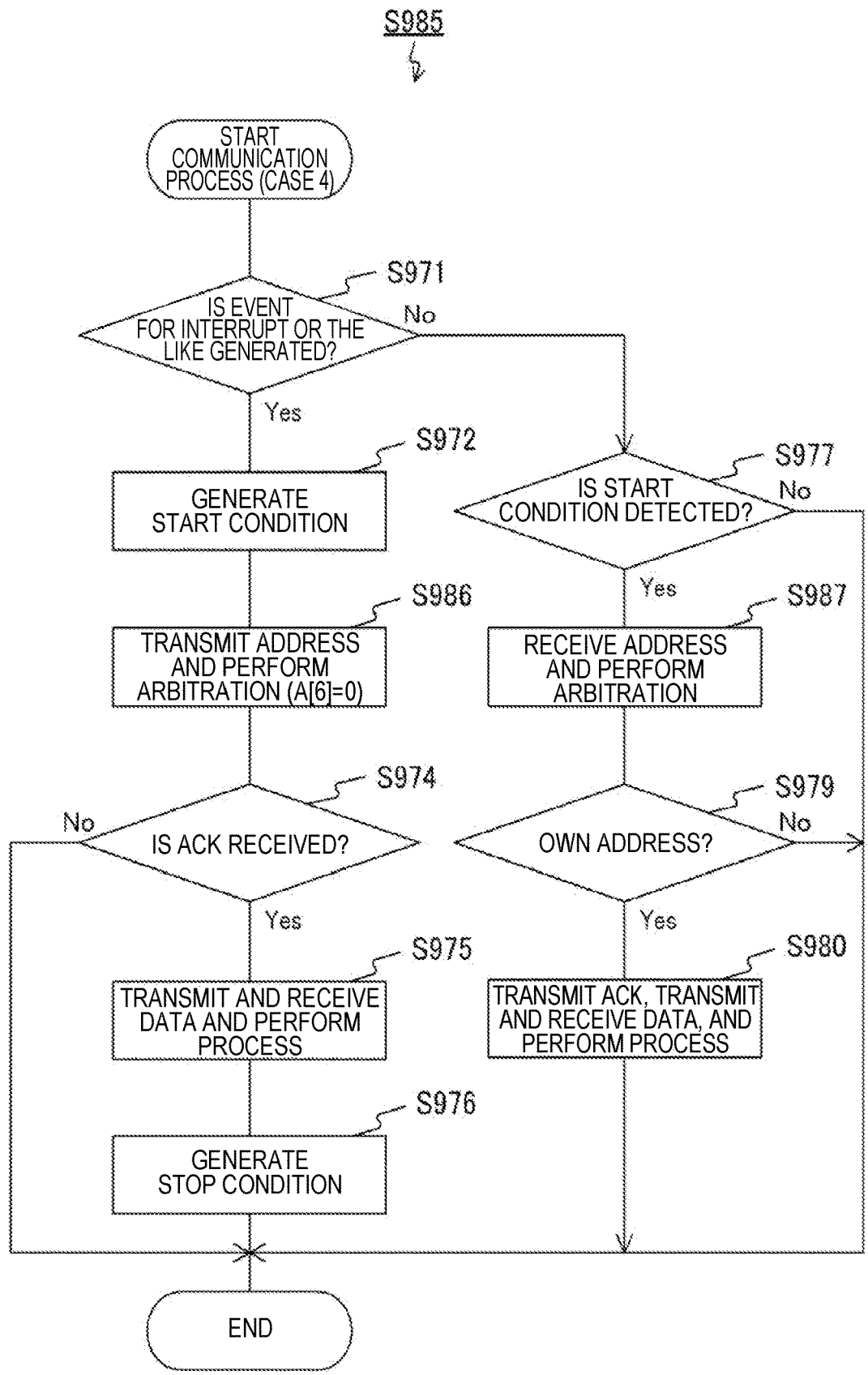
FIG. 25 is a flowchart illustrating an exemplary slave side communication process corresponding to the case 4 in the second embodiment of the present technology.

FIG. 25 is a flowchart illustrating an exemplary slave side communication process corresponding to the case 4 in the second embodiment. The communication process of the case 4 is the same as the communication process of the case 3 except that Steps S986 and S987 are performed in place of Steps S973 and S978. When an event for the interrupt or the like has occurred (Yes in Step S971), the slave generates a start condition (Step S972). Therefore, the slave transmits an address whose first bit (arbitration bit) A[6] is set to "0," performs arbitration when collision has occurred (Step S986), and performs processes after Step S974.

In addition, when the start condition is detected (Step S977), the slave transmits the dynamic address, performs arbitration when collision has occurred (Step S987), and performs processes after Step S979.

In this manner, according to the second embodiment of the present technology, since the master and the slave transmit dynamic addresses in which different fixed values are set in the first bits following the start condition, it is possible to detect collision in the first bit and perform arbitration. In addition, it is possible to increase the communication rate compared to the case 0 or the like in which pattern data is transmitted.

Note that the above embodiments are only examples for implementing the present technology and items in the embodiments have correspondence relations with technology-defining items in the scope of the appended claims. Similarly, the technology-defining items in the scope of the appended claims have correspondence relations with items in the embodiments of the present technology denoted by the same names. However, the present technology is not limited to the embodiments, but various modifications of the embodiments may be implemented without departing from the spirit and scope of the present technology.

In addition, the processing sequences described in the above embodiments may be prepared as a method including such series of procedures, or a program causing a computer to execute such series of procedures or a recording medium recording the program. As the recording medium, for example, a compact disc (CD), a MiniDisc (MD), a digital versatile disc (DVD), a memory card, and a Blu-ray (registered trademark) disc can be used.

Note that effects described herein are not necessarily limited, but any effect described in the present disclosure may be achieved.

It should be understood by those skilled in the art that various modifications, combinations, sub-combinations and alterations may occur depending on design requirements and other factors insofar as they are within the scope of the appended claims or the equivalents thereof.

Note that the present technology can be configured as follows.

(1) A communication system including:
a first slave device configured to transmit and receive data when a start bit indicating communication start, predetermined pattern data in which a specific value is set in a first bit, and a first address in which the specific value is set in a first bit are received;

a second slave device configured to sequentially transmit the start bit and a second address in which a value different from the specific value is set in a first bit and transmit and receive data; and a master device configured to sequentially transmit the start bit, the predetermined pattern data, and any of the first address and the second address and arbitrates the second slave device and another device based on the first bit.

(2) The communication system according to item (1),
wherein the master device and the first and second slave devices transmit and receive the data according to a communication standard of I3C.

(3) The communication system according to item (2),
wherein the first slave device stores setting information indicating inclusion in a group for which arbitration is necessary,
wherein the second slave device stores the setting information indicating inclusion in a group for which arbitration is unnecessary, and
wherein the master device allocates the first address to the first slave device and allocates the second address to the second slave device based on the setting information.

(4) The communication system according to item (3),
wherein the first and second slave devices store the setting information in a bus characteristic register.

(5) A device to which an address in which inclusion or non-inclusion in a group for which arbitration is necessary is set in a first bit is allocated.

(6) A device including:
a transmission unit configured to sequentially transmit a start bit indicating communication start, predetermined pattern data, and an address in which inclusion or non-inclusion in a group for which arbitration is necessary is set in a first bit; and an arbitration unit configured to arbitrate a slave device and another device based on the first bit.

(7) A communication system control method including:
a first slave side procedure in which, when a start bit indicating communication start, predetermined pattern data in which a specific value is set in a first bit, and a first address in which the specific value is set in a first bit are received, a first slave device transmits and receives data;

a second slave side procedure in which a second slave device sequentially transmits the start bit and a second address in which a value different from the specific value is set in a first bit and transmits and receives data; and a master side procedure in which a master device sequentially transmits the start bit, the predetermined pattern data, and any of the first address and the second address and arbitrates the second slave device and another device based on the first bit.

(8) A program causing a computer to execute:
a first slave side procedure in which, when a start bit indicating communication start, predetermined pattern data in which a specific value is set in a first bit, and a first address in which the specific value is set in a first bit are received, a first slave device transmits and receives data;

a second slave side procedure in which a second slave device sequentially transmits the start bit and a second address in which a value different from the specific value is set in a first bit and transmits and receives data; and a master side procedure in which a master device sequentially transmits the start bit, the predetermined pattern data, and any of the first address and the second address and arbitrates the second slave device and another device based on the first bit.

(9) A communication system including:

a slave device configured to sequentially transmit a start bit indicating communication start and a transmission source address in which a specific value is set in a first bit; and a master device configured to sequentially transmit the start bit and a transmission destination address in which a value that does not correspond to the specific value is set in a first bit and arbitrate the slave device and another device based on the first bit.

(10) The communication system according to item (9), wherein the slave device includes an arbitration target slave device for which an arbitration process is necessary and an arbitration-unnecessary slave device for which an arbitration process is unnecessary, and wherein the master device allocates the address to the arbitration target device and allocates an address in which a bit string except for a first bit is different from a bit string of the arbitration target slave device to the arbitration-unnecessary device.

(11) A device configured to sequentially transmit a start bit indicating communication start and a transmission source address in which a fixed value is set in a first bit.

(12) A device including:

a transmission unit configured to sequentially transmit a start bit indicating communication start and a transmission destination address in which a fixed value is set in a first bit; and an arbitration unit configured to arbitrate a slave device and another device based on the first bit.

(13) A communication system control method including:

a slave side procedure in which a slave device sequentially transmits a start bit indicating communication start and a transmission source address in which a specific value is set in a first bit; and a master side procedure in which a master device sequentially transmits the start bit and a transmission destination address in which a value that does not correspond to the specific value is set in a first bit and arbitrates the slave device and another device based on the first bit.

(14) A program causing a computer to execute:

a slave side procedure in which a slave device sequentially transmits a start bit indicating communication start and a transmission source address in which a specific value is set in a first bit; and a master side procedure in which a master device sequentially transmits the start bit and a transmission destination address in which a value that does not correspond to the specific value is set in a first bit and arbitrates the slave device and another device based on the first bit.

What is claimed is:

1. A communication system comprising:

a master device configured to sequentially transmit a start bit indicating communication start and predetermined pattern data, and to transmit and receive data;

a first slave device including a first bus characteristic register, the first slave device being configured to perform at least one of an in-band interrupt request or a secondary master request; and a second slave device including a second bus characteristic register, wherein the second slave device is not configured to perform the in-band interrupt request or the secondary master request, wherein the first bus characteristic register of the first slave device stores a first setting information indicating that the first slave device is configured to perform the secondary master request, the second bus characteristic register of the second slave device stores a second setting information indicating that the second slave device is not configured to perform the secondary master request, and the first bus characteristic register of the first slave device stores a third setting information indicating that the first slave device is configured to perform the in-band interrupt request.

2. The communication system according to claim 1, wherein the second bus characteristic register of the second slave device stores a fourth setting information indicating that the second slave device is not configured to perform the in-band interrupt request.

3. The communication system according to claim 2, wherein the first setting information is stored in a set of one or more bits at a first designated location in the first bus characteristic register.

4. The communication system according to claim 3, wherein the second setting information is stored in a set of one or more bits at the first designated location in the second bus characteristic register.

5. The communication system according to claim 4, wherein the third setting information is stored in a set of one or more bits at a second designated location in the first bus characteristic register.

6. The communication system according to claim 5, wherein the fourth setting information is stored in a set of one or more bits at the second designated location in the second bus characteristic register.

* * * * *